(12) United States Patent
Liu et al.

(10) Patent No.: US 10,172,142 B2
(45) Date of Patent: Jan. 1, 2019

(54) INTERFERENCE COORDINATOR METHOD AND DEVICE

(71) Applicant: Huawei Technologies Co., Ltd., Shenzhen (CN)

(72) Inventors: Rui Liu, Shanghai (CN); Fazhong Si, Shanghai (CN); Liping Yang, Shanghai (CN); Xia Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 119 days.

(21) Appl. No.: 15/418,392

(22) Filed: Jan. 27, 2017

(65) Prior Publication Data

US 2017/0142736 A1 May 18, 2017

Related U.S. Application Data

(63) Continuation of application No. PCT/CN2014/083243, filed on Jul. 29, 2014.

(51) Int. Cl.
*H04W 72/08* (2009.01)
*H04W 16/14* (2009.01)
*H04W 16/10* (2009.01)

(52) U.S. Cl.
CPC ......... *H04W 72/082* (2013.01); *H04W 16/14* (2013.01); *H04W 16/10* (2013.01)

(58) Field of Classification Search
CPC ... H04W 72/082; H04W 24/10; H04W 24/02; H04W 52/243; H04W 16/14; H04W 24/08; H04W 72/0453; H04W 72/1231; H04W 16/10; H04B 17/345; H04B 7/0452; H04B 7/0456; H04B 17/26; H04B 1/10; H04B 1/7097; H04B 7/0639; H04B 17/382; H04B 1/719; H04B 2201/709718;
(Continued)

(56) References Cited

U.S. PATENT DOCUMENTS 6,223,041 B1* 4/2001 Egner ................... H04W 16/04
455/450
6,871,073 B1* 3/2005 Boyer ................... H04W 16/10
455/446
(Continued)

FOREIGN PATENT DOCUMENTS

CN 102017764 A 4/2011
CN 102202310 A 9/2011
(Continued)

*Primary Examiner* — Michael J Moore, Jr.
(74) *Attorney, Agent, or Firm* — Leydig, Voit & Mayer, Ltd.

(57) ABSTRACT

For a terminal located in any area of a first cell in a first system, a sum of actual interference of all second cells to any spectrum resource to be used by the terminal can be determined according to a pre-established interference matrix for representing historical reference interference of each second cell in a second system to each area in the first cell and a spectrum resource real-time occupation status of each second cell; when it is determined that the sum does not exceed a preset interference threshold value range, it is determined that the terminal can use the any spectrum resource; or when it is determined that the sum exceeds a preset interference threshold value range, it is determined that the terminal cannot use the any spectrum resource.

24 Claims, 5 Drawing Sheets

(58) Field of Classification Search
CPC .......... H04B 2001/1045; H04B 7/0634; H04L 5/0073; H04L 5/0035
See application file for complete search history.

(56) References Cited

U.S. PATENT DOCUMENTS

| | | | |
|---|---|---|---|
| 8,126,403 B2 | 2/2012 | Wang Helmersson et al. | |
| 2006/0210001 A1* | 9/2006 | Li | H04W 52/243 375/346 |
| 2007/0178840 A1 | 8/2007 | Deguchi | |
| 2008/0107071 A1* | 5/2008 | Tsigler | H04W 16/10 370/329 |
| 2010/0062717 A1* | 3/2010 | Brisebois | H04W 72/085 455/63.1 |
| 2011/0081865 A1* | 4/2011 | Xiao | H04W 52/243 455/63.1 |
| 2012/0071102 A1* | 3/2012 | Palomar | H04W 16/14 455/63.1 |
| 2012/0257585 A1 | 10/2012 | Sydor et al. | |
| 2013/0012224 A1 | 1/2013 | Yang et al. | |
| 2013/0217429 A1* | 8/2013 | Kimura | H04W 16/14 455/509 |
| 2014/0128115 A1* | 5/2014 | Siomina | H04L 1/0015 455/501 |
| 2015/0141027 A1* | 5/2015 | Tsui | H04W 52/243 455/452.1 |
| 2015/0146646 A1* | 5/2015 | Chen | H04W 52/346 370/329 |

FOREIGN PATENT DOCUMENTS

| | | |
|---|---|---|
| CN | 102547730 A | 1/2012 |
| CN | 102547730 A | 7/2012 |
| CN | 103718585 A | 4/2014 |
| CN | 103841565 A | 6/2014 |
| EP | 2750468 A1 | 7/2014 |
| EP | 2963960 A1 | 1/2016 |

* cited by examiner

INTERFERENCE COORDINATOR METHOD AND DEVICE

CROSS-REFERENCE TO RELATED APPLICATIONS

This application is a continuation of International Application No. PCT/CN2014/083243, filed on Jul. 29, 2014, the disclosure of which is hereby incorporated by reference in its entirety.

TECHNICAL FIELD

The present invention relates to the field of communications technologies, and in particular, to an interference coordination method and device.

BACKGROUND

A spectrum resource is a basis on which an operator operates a network, and rareness of the spectrum resource determines that a spectrum is a very precious resource. In addition, continuous development of mobile broadband and continuous evolution of 3G (third generation mobile telecommunications) and 4G (fourth generation mobile telecommunications) networks have resulted in an increasingly stronger demand of the operator for improving spectral efficiency. On this basis, in order to improve spectrum utilization, the operator proposes a Refarming (spectrum reallocation) technology. The Refarming refers to spectrum replanning, for example, generally refers to giving a section of a spectrum used by a low-standard system to a high-standard system for use, so as to improve the spectrum utilization without adding spectrum resources. Specifically, by using GL Refarming (GSM<E Refarming) as an example, GL Refarming refers to giving one section of a spectrum of GSM (Global System for Mobile Communication, Global System for Mobile Communications) to LTE (Long Term Evolution, Long Term Evolution) for use.

Specifically, during deployment of a GL Refarming solution, interference between the GSM system and the LTE system is a problem that needs to be solved first. At present, in this field, a GSM spectrum and an LTE spectrum are generally put at two ends of a spectrum respectively, or the interference between the GSM system and the LTE system is reduced by means of space isolation. That is, during deployment of the GL Refarming solution, in an area in which LTE has been deployed, GSM can use only a spectrum that is not occupied by LTE; otherwise, poor performance is caused by mutual co-channel interference between GSM and LTE; or a certain isolation distance is reserved geographically so that GSM can use the spectrum used by LTE.

For example, as shown in FIG. 1, assuming that an LTE site is deployed in area A and a frequency used by the LTE site is FB1, GSM can use only a frequency FB2 that is different from FB1 in area A. Correspondingly, in order to avoid the problem of co-channel interference between GSM and LTE, a certain co-channel isolation zone, for example, area B, can be reserved geographically, and GSM can also use only the frequency FB2 in area B serving as the co-channel isolation zone. Further, with protection of the co-channel isolation zone, GSM can use frequencies FB1 and FB2 in area C.

As can be seen from the foregoing content, at present, during deployment of the GL Refarming solution, LTE bandwidth that can be deployed needs to be limited by traffic load of the original GSM network. Because GSM has high traffic load in some areas and cannot give over more spectrums, only LTE with low bandwidth (for example, 5 MHz) can be deployed and throughput superiority brought by deployment of LTE with high bandwidth cannot be acquired; and an additional spectrum needs to be purchased if it is expected to deploy LTE with high bandwidth. Moreover, in the area in which LTE is deployed and the co-channel isolation zone around LTE, GSM can use only a frequency that is not used by LTE, thereby causing low spectrum utilization; due to a sharp reduction of spectrums available to GSM, loss of capacity and performance of the GSM network is caused.

In view of the foregoing problems, a corresponding LTE bandwidth compression solution is put forward in this field, that is, an LTE standard bandwidth is compressed by using an advanced filter technology and a scheduling algorithm. For example, 20M LTE standard bandwidth is compressed to 18 M by using a bandwidth compression technology, and the 2M spectrum obtained after the compression may be used for GSM deployment, so as to deploy LTE with relatively high bandwidth on an existing GSM spectrum under the premise of satisfying the capacity and the performance of the original GSM network.

However, because the spectrum compressed by using the bandwidth compression technology is very limited, in most scenarios, requirements of the original GSM network for the capacity and performance still cannot be met, and moreover, LTE with relatively high bandwidth cannot be deployed on an existing GSM spectrum, and an additional spectrum needs to be purchased if it is expected to deploy LTE with high bandwidth. Furthermore, in a same geographic area, GSM and LTE can only be deployed at adjacent frequencies, that is, either GSM or LTE uses a spectrum resource in a frequency domain; otherwise, severe co-channel interference is caused between GSM and LTE. Therefore, problems such as low spectrum utilization still exist.

SUMMARY

Embodiments of the present invention provide an interference coordination method and device, so as to solve existing problems that LTE with relatively high bandwidth cannot be deployed and spectrum utilization is low during GL Refarming deployment.

According to a first aspect, a network-side coordination device is provided, including:

a matrix establishment unit, configured to pre-establish an interference matrix for representing historical reference interference of each second cell to each area in a first cell, where the first cell is any cell in a first system, the second cell is any cell in a second system, and the second cell is a neighboring cell of the first cell;

a request receiving unit, configured to receive an interference coordination request initiated by a terminal located in any area of the first cell, where the interference coordination request is initiated to the network-side coordination device before the terminal uses any to-be-used spectrum resource;

a status acquiring unit, configured to acquire a spectrum resource real-time occupation status of each second cell;

an interference coordination unit, configured to determine, according to the interference matrix that is pre-established by the matrix establishment unit and used to represent the historical reference interference of each second cell to each area in the first cell and the spectrum resource real-time occupation status of each second cell acquired by the status acquiring unit, a sum of actual interference of all second cells to the any to-be-used spectrum resource to be used by the terminal; determine whether the determined sum of the actual interference does not exceed a preset interference threshold value range; and if yes, trigger an indication sending unit to deliver a first scheduling indication to the terminal, or if not, trigger an indication sending unit to deliver a second scheduling indication to the terminal; and the indication sending unit, configured to deliver, as triggered by the interference coordination unit, the first scheduling indication to the terminal, to indicate that the terminal can use the any to-be-used spectrum resource; or configured to deliver, as triggered by the interference coordination unit, the second scheduling indication to the terminal, to indicate that the terminal cannot use the any to-be-used spectrum resource.

With reference to the first aspect, in a first possible implementation manner of the first aspect, the first system and the second system are a combination of any two of GSM (Global System for Mobile Communications, Global System for Mobile Communications), UMTS (Universal Mobile Telecommunications System, Universal Mobile Telecommunications System), LTE (Long Term Evolution, Long Term Evolution), CDMA (Code Division Multiple Access, Code Division Multiple Access), TD-SCDMA (Time Division-Synchronous Code Division Multiple Access, Time Division-Synchronous Code Division Multiple Access), and WLAN (wireless local area network).

With reference to the first aspect or the first possible implementation manner of the first aspect, in a second possible implementation manner of the first aspect, the matrix establishment unit is specifically configured to establish the interference matrix based on measurement information that is reported by each terminal in the first cell within a preset time period and collected in advance, where the measurement information includes any one or more of signal strength of a signal received by each terminal in the first cell from each second cell, signal quality of the signal received by each terminal in the first cell from each second cell, a distance between each second cell and a location of each terminal in the first cell, and a signal loss of a signal transmitted from each second cell to the location of each terminal in the first cell.

With reference to the second possible implementation manner of the first aspect, in a third possible implementation manner of the first aspect, the matrix establishment unit is further configured to collect, in real time or regularly, the measurement information reported by each terminal in the first cell, and update the pre-established interference matrix according to the measurement information that is reported by each terminal in the first cell and collected in real time or regularly.

With reference to the second or the third possible implementation manner of the first aspect, in a fourth possible implementation manner of the first aspect, the matrix establishment unit is specifically configured to divide a cell coverage area of the first cell into N sub-areas according to a set area division rule, where N is any natural number; for any sub-area, determine, according to the measurement information that is reported by each terminal in the first cell and collected in the set time period, historical reference interference of each spectrum resource configured in each second cell to the any sub-area; and generate, according to the determined historical reference interference of each spectrum resource configured in each second cell to the any sub-area, an interference sub-matrix corresponding to the any sub-area, and use an interference sub-matrix set formed by all determined interference sub-matrixes corresponding to all sub-areas as the established interference matrix for representing the historical reference interference of each second cell to each area in the first cell.

With reference to the first aspect, or any implementation manner of the first to the fourth possible implementation manners of the first aspect, in a fifth possible implementation manner of the first aspect, an expression manner of the historical reference interference or the actual interference of each second cell to each area in the first cell at least includes:

any one or more of signal strength of a signal transmitted from each second cell when the signal arrives at each area in the first cell, signal quality of the signal transmitted from each second cell when the signal arrives at each area in the first cell, a distance between each second cell and each area in the first cell, and a signal loss of a signal transmitted from each second cell when the signal arrives at each area in the first cell.

With reference to any implementation manner of the first to the fifth possible implementation manners of the first aspect, in a sixth possible implementation manner of the first aspect, if the first cell is any cell in the LTE system and the second cell is any cell in the GSM system, the interference coordination unit is specifically configured to:

determine a spectrum resource real-time occupation status S of each second cell, where the spectrum resource real-time occupation status S is shown in the following formula:

S={CELL_1(X0, X1, . . . , Xi), CELL_2(X0, X1, . . . , Xi), . . . , CELL_n(X0, X1, . . . , Xi)}, where n is a quantity of the second cells and n is any natural number; i indicates a quantity of spectrum resources configured in each second cell and i is any natural number; and Xi indicates a real-time occupation status of the $i^{th}$ spectrum resource configured in each second cell, where it indicates that the spectrum resource is occupied if a value of Xi is 1 and it indicates that the spectrum resource is released if the value is 0;

determine, according to the interference matrix, historical reference interference $I_n$ of each spectrum resource configured in the $n^{th}$ second cell to the terminal in the any area, where $I_n$ is shown in the following formula:

$I_n$=CELL_n(Y0, Y1, . . . , Yi), where CELL_n(Yi) indicates historical reference interference of the $i^{th}$ spectrum resource configured in the $n^{th}$ second cell to the terminal in the any area; and determine, by using the following formula, a sum $I_{total}$ of actual interference of all spectrum resources configured in all second cells to any spectrum resource to be used by the terminal in the any area:

$I_{total}$=CELL_1(X0*Y0*θ0+X1*Y1*θ1+ . . . +Xi*Yi*θi)+ CELL_2(X0*Y0*θ0+X1*Y1*θ1+ . . . +Xi*Yi*θi)+ . . . + CELL_n(X0*Y0*θ0+X1*Y1*θ1+ . . . +Xi*Yi*θi), where θ indicates an interference weight modification value of each spectrum resource, and CELL_n(Xi*Yi) indicates actual interference of the $i^{th}$ spectrum resource configured in the $n^{th}$ second cell to the any spectrum resource to be used by the terminal in the any area.

According to a second aspect, a terminal is provided, including:

a request sending unit, configured to: when the terminal is located in any area of a first cell and before the terminal uses any to-be-used spectrum resource, initiate an interference coordination request to a network-side coordination device for the any to-be-used spectrum resource;

an indication receiving unit, configured to receive a first scheduling indication or a second scheduling indication delivered by the network-side coordination device, where the first scheduling indication is delivered by the network-side coordination device to the terminal when the network-side coordination device determines, after receiving the interference coordination request and according to a pre-established interference matrix for representing historical reference interference of each second cell to each area in the first cell and an acquired spectrum resource real-time occupation status of each second cell, that a sum of actual interference of all second cells to the any to-be-used spectrum resource to be used by the terminal does not exceed a preset interference threshold value range; the second scheduling indication is delivered by the network-side coordination device to the terminal when the network-side coordination device determines that the sum of the actual interference of all second cells to the any to-be-used spectrum resource to be used by the terminal exceeds the preset interference threshold value range; the first cell is any cell in a first system, the second cell is any cell in a second system, and the second cell is a neighboring cell of the first cell; and an indication processing unit, configured to: when the indication receiving unit receives the first scheduling indication delivered by the network-side coordination device, use the any to-be-used spectrum resource according to the first scheduling indication; or configured to: when the indication receiving unit receives the second scheduling indication delivered by the network-side coordination device, refuse to use the any to-be-used spectrum resource according to the second scheduling indication.

With reference to the second aspect, in a first possible implementation manner of the second aspect, the first system and the second system are a combination of any two of GSM, UMTS, LTE, CDMA, TD-SCDMA, and WLAN.

With reference to the second aspect or the first possible implementation manner of the second aspect, in a second possible implementation manner of the second aspect, the terminal further includes an information reporting unit, where the information reporting unit is configured to report measurement information to the network-side coordination device in real time or regularly before, at the same time when, or after the terminal initiates the interference coordination request to the network-side coordination device, where the measurement information includes any one or more of signal strength of a signal received by the terminal from each second cell, signal quality of the signal received by the terminal from each second cell, a distance between each second cell and a location of the terminal, and a signal loss of a signal transmitted from each second cell to the location of the terminal.

According to a third aspect, a control device is provided, including:

a status acquiring unit, configured to acquire a spectrum resource real-time occupation status of a second cell; and a status reporting unit, configured to report the spectrum resource real-time occupation status acquired by the status acquiring unit to a network-side coordination device, so that the network-side coordination device determines, when receiving an interference coordination request initiated by a terminal located in any area of a first cell for any to-be-used spectrum resource, and according to a pre-established interference matrix for representing historical reference interference of each second cell to each area in the first cell and the acquired spectrum resource real-time occupation status of each second cell, a sum of actual interference of all second cells to the any to-be-used spectrum resource to be used by the terminal, and delivers a first scheduling indication to the terminal when determining that the sum of the actual interference does not exceed a preset interference threshold value range, to indicate that the terminal can use the any to-be-used spectrum resource; or delivers a second scheduling indication to the terminal when determining that the sum of the actual interference exceeds a preset interference threshold value range, to indicate that the terminal cannot use the any to-be-used spectrum resource, where the first cell is any cell in a first system, the second cell is any cell in a second system, and the second cell is a neighboring cell of the first cell.

With reference to the third aspect, in a first possible implementation manner of the third aspect, the first system and the second system are a combination of any two of GSM, UMTS, LTE, CDMA, TD-SCDMA, and WLAN.

According to a fourth aspect, a network-side coordination device is provided, including:

a receiver, configured to receive an interference coordination request initiated by a terminal located in any area of a first cell, where the interference coordination request is initiated to the network-side coordination device before the terminal uses any to-be-used spectrum resource;

a processor, configured to pre-establish an interference matrix for representing historical reference interference of each second cell to each area in the first cell; acquire a spectrum resource real-time occupation status of each second cell; determine, according to the pre-established interference matrix and the acquired spectrum resource real-time occupation status of each second cell, a sum of actual interference of all second cells to the any to-be-used spectrum resource to be used by the terminal; determine whether the determined sum of the actual interference does not exceed a preset interference threshold value range; and if yes, trigger a sender to deliver a first scheduling indication to the terminal, or if not, trigger a sender to deliver a second scheduling indication to the terminal; and the sender, configured to deliver, as triggered by the processor, the first scheduling indication to the terminal, to indicate that the terminal can use the any to-be-used spectrum resource; or deliver, as triggered by the processor, the second scheduling indication to the terminal, to indicate that the terminal cannot use the any to-be-used spectrum resource, where the first cell is any cell in a first system, the second cell is any cell in a second system, and the second cell is a neighboring cell of the first cell.

With reference to the fourth aspect, in a first possible implementation manner of the fourth aspect, the first system and the second system are a combination of any two of GSM, UMTS, LTE, CDMA, TD-SCDMA, and WLAN.

With reference to the fourth aspect or the first possible implementation manner of the fourth aspect, in a second possible implementation manner of the fourth aspect, the processor is specifically configured to establish the interference matrix based on measurement information that is reported by each terminal in the first cell within a preset time period and collected in advance, where the measurement information includes any one or more of signal strength of a signal received by each terminal in the first cell from each second cell, signal quality of the signal received by each terminal in the first cell from each second cell, a distance between each second cell and a location of each terminal in the first cell, and a signal loss of a signal transmitted from each second cell to the location of each terminal in the first cell.

With reference to the second possible implementation manner of the fourth aspect, in a third possible implementation manner of the fourth aspect, the processor is further configured to collect, in real time or regularly, the measurement information reported by each terminal in the first cell, and update the pre-established interference matrix according to the measurement information that is reported by each terminal in the first cell and collected in real time or regularly.

With reference to the second or the third possible implementation manner of the fourth aspect, in a fourth possible implementation manner of the fourth aspect, the processor is specifically configured to divide a cell coverage area of the first cell into N sub-areas according to a set area division rule, where N is any natural number; for any sub-area, determine, according to the measurement information that is reported by each terminal in the first cell and collected in the set time period, historical reference interference of each spectrum resource configured in each second cell to the any sub-area; and generate, according to the determined historical reference interference of each spectrum resource configured in each second cell to the any sub-area, an interference sub-matrix corresponding to the any sub-area, and use an interference sub-matrix set formed by all determined interference sub-matrixes corresponding to all sub-areas as the established interference matrix for representing the historical reference interference of each second cell to each area in the first cell.

With reference to the fourth aspect, or any implementation manner of the first to the fourth possible implementation manners of the fourth aspect, in a fifth possible implementation manner of the fourth aspect, an expression manner of the historical reference interference or the actual interference of each second cell to each area in the first cell at least includes:

any one or more of signal strength of a signal transmitted from each second cell when the signal arrives at each area in the first cell, signal quality of the signal transmitted from each second cell when the signal arrives at each area in the first cell, a distance between each second cell and each area in the first cell, and a signal loss of a signal transmitted from each second cell when the signal arrives at each area in the first cell.

With reference to any implementation manner of the first to the fifth possible implementation manners of the fourth aspect, in a sixth possible implementation manner of the fourth aspect, if the first cell is any cell in the LTE system and the second cell is any cell in the GSM system, the processor is specifically configured to:

determine a spectrum resource real-time occupation status S of each second cell, where the spectrum resource real-time occupation status S is shown in the following formula:

$S=\{CELL\_1(X0, X1, \ldots, Xi), CELL\_2(X0, X1, \ldots, Xi), \ldots, CELL\_n(X0, X1, \ldots, Xi)\}$, where n is a quantity of the second cells and n is any natural number; i indicates a quantity of spectrum resources configured in each second cell and i is any natural number; and Xi indicates a real-time occupation status of the $i^{th}$ spectrum resource configured in each second cell, where it indicates that the spectrum resource is occupied if a value of Xi is 1 and it indicates that the spectrum resource is released if the value is 0;

determine, according to the interference matrix, historical reference interference $I_n$ of each spectrum resource configured in the $n^{th}$ second cell to the terminal in the any area, where $I_n$ is shown in the following formula:

$I_n=CELL\_n(Y0, Y1, \ldots, Yi)$, where $CELL\_n(Yi)$ indicates historical reference interference of the $i^{th}$ spectrum resource configured in the $n^{th}$ second cell to the terminal in the any area; and determine, by using the following formula, a sum $I_{total}$ of actual interference of all spectrum resources configured in all second cells to any spectrum resource to be used by the terminal in the any area:

$I_{total}=CELL\_1(X0*Y0*\theta0+X1*Y1*\theta1+\ldots+Xi*Yi*\theta i)+ CELL\_2(X0*Y0*\theta0+X1*Y1*\theta1+ \ldots +Xi*Yi*\theta i)+\ldots+CELL\_n(X0*Y0*\theta0+X1*Y1*\theta1+\ldots+Xi*Yi*\theta i)$, where $\theta$ indicates an interference weight modification value of each spectrum resource, and $CELL\_n(Xi*Yi)$ indicates actual interference of the $i^{th}$ spectrum resource configured in the $n^{th}$ second cell to the any spectrum resource to be used by the terminal in the any area.

According to a fifth aspect, a terminal is provided, including:

a sender, configured to: when the terminal is located in any area of a first cell and before the terminal uses any to-be-used spectrum resource, initiate an interference coordination request to a network-side coordination device for the any to-be-used spectrum resource;

a receiver, configured to receive a first scheduling indication or a second scheduling indication delivered by the network-side coordination device, where the first scheduling indication is delivered by the network-side coordination device to the terminal when the network-side coordination device determines, after receiving the interference coordination request and according to a pre-established interference matrix for representing historical reference interference of each second cell to each area in the first cell and an acquired spectrum resource real-time occupation status of each second cell, that a sum of actual interference of all second cells to the any to-be-used spectrum resource to be used by the terminal does not exceed a preset interference threshold value range; the second scheduling indication is delivered by the network-side coordination device to the terminal when the network-side coordination device determines that the sum of the actual interference of all second cells to the any to-be-used spectrum resource to be used by the terminal exceeds the preset interference threshold value range; the first cell is any cell in a first system, the second cell is any cell in a second system, and the second cell is a neighboring cell of the first cell; and a processor, configured to: when the receiver receives the first scheduling indication delivered by the network-side coordination device, use the any to-be-used spectrum resource according to the first scheduling indication; or configured to: when the receiver receives the second scheduling indication delivered by the network-side coordination device, refuse to use the any to-be-used spectrum resource according to the second scheduling indication.

With reference to the fifth aspect, in a first possible implementation manner of the fifth aspect, the first system and the second system are a combination of any two of GSM, UMTS, LTE, CDMA, TD-SCDMA, and WLAN.

With reference to the fifth aspect or the first possible implementation manner of the fifth aspect, in a second possible implementation manner of the fifth aspect, the sender is further configured to report measurement information to the network-side coordination device in real time or regularly before, at the same time when, or after the terminal initiates the interference coordination request to the network-side coordination device, where the measurement information includes any one or more of signal strength of a signal received by the terminal from each second cell, signal quality of the signal received by the terminal from each second cell, a distance between each second cell and a location of the terminal, and a signal loss of a signal transmitted from each second cell to the location of the terminal.

According to a sixth aspect, a control device is provided, including:

a processor, configured to acquire a spectrum resource real-time occupation status of a second cell; and a sender, configured to report the spectrum resource real-time occupation status acquired by the processor to a network-side coordination device, so that the network-side coordination device determines, when receiving an interference coordination request initiated by a terminal located in any area of a first cell for any to-be-used spectrum resource, and according to a pre-established interference matrix for representing historical reference interference of each second cell to each area in the first cell and the acquired spectrum resource real-time occupation status of each second cell, a sum of actual interference of all second cells to the any to-be-used spectrum resource to be used by the terminal, and delivers a first scheduling indication to the terminal when determining that the sum of the actual interference does not exceed a preset interference threshold value range, to indicate that the terminal can use the any to-be-used spectrum resource; or delivers a second scheduling indication to the terminal when determining that the sum of the actual interference exceeds a preset interference threshold value range, to indicate that the terminal cannot use the any to-be-used spectrum resource, where the first cell is any cell in a first system, the second cell is any cell in a second system, and the second cell is a neighboring cell of the first cell.

With reference to the sixth aspect, in a first possible implementation manner of the sixth aspect, the first system and the second system are a combination of any two of GSM, UMTS, LTE, CDMA, TD-SCDMA, and WLAN.

According to a seventh aspect, an interference coordination method is provided, including:

receiving, by a network-side coordination device, an interference coordination request initiated by a terminal located in any area of a first cell, where the interference coordination request is initiated to the network-side coordination device before the terminal uses any to-be-used spectrum resource;

determining, according to a pre-established interference matrix for representing historical reference interference of each second cell to each area in the first cell and an acquired spectrum resource real-time occupation status of each second cell, a sum of actual interference of all second cells to the any to-be-used spectrum resource to be used by the terminal; and determining whether the determined sum of the actual interference does not exceed a preset interference threshold value range; and if yes, delivering a first scheduling indication to the terminal, to indicate that the terminal can use the any to-be-used spectrum resource, or if not, delivering a second scheduling indication to the terminal, to indicate that the terminal cannot use the any to-be-used spectrum resource, where the first cell is any cell in a first system, the second cell is any cell in a second system, and the second cell is a neighboring cell of the first cell.

With reference to the seventh aspect, in a first possible implementation manner of the seventh aspect, the first system and the second system are a combination of any two of GSM, UMTS, LTE, CDMA, TD-SCDMA, and WLAN.

With reference to the seventh aspect or the first possible implementation manner of the seventh aspect, in a second possible implementation manner of the seventh aspect, the interference matrix is established by the network-side coordination device based on measurement information that is reported by each terminal in the first cell within a set time period and collected in advance, where the measurement information includes any one or more of signal strength of a signal received by each terminal in the first cell from each second cell, signal quality of the signal received by each terminal in the first cell from each second cell, a distance between each second cell and a location of each terminal in the first cell, and a signal loss of a signal transmitted from each second cell to the location of each terminal in the first cell.

With reference to the second possible implementation manner of the seventh aspect, in a third possible implementation manner of the seventh aspect, the method further includes:

collecting, in real time or regularly, the measurement information that is reported by each terminal in the first cell, and updating the pre-established interference matrix based on the measurement information that is reported by each terminal in the first cell and collected in real time or regularly.

With reference to the second or the third possible implementation manner of the seventh aspect, in a fourth possible implementation manner of the seventh aspect, the establishing the interference matrix based on measurement information that is reported by each terminal in the first cell within a set time period and collected in advance includes:

dividing a cell coverage area of the first cell into N sub-areas according to a set area division rule, where N is any natural number;

for any sub-area, determining, according to the measurement information that is reported by each terminal in the first cell and collected in the set time period, historical reference interference of each spectrum resource configured in each second cell to the any sub-area, and generating, according to the determined historical reference interference of each spectrum resource configured in each second cell to the any sub-area, an interference sub-matrix corresponding to the any sub-area; and using an interference sub-matrix set formed by all determined interference sub-matrixes corresponding to all sub-areas as the established interference matrix for representing the historical reference interference of each second cell to each area in the first cell.

With reference to the seventh aspect, or any implementation manner of the first to the fourth possible implementation manners of the seventh aspect, in a fifth possible implementation manner of the seventh aspect, an expression manner of the historical reference interference or the actual interference of each second cell to each area in the first cell at least includes:

any one or more of signal strength of a signal transmitted from each second cell when the signal arrives at each area in the first cell, signal quality of the signal transmitted from each second cell when the signal arrives at each area in the first cell, a distance between each second cell and each area in the first cell, and a signal loss of a signal transmitted from each second cell when the signal arrives at each area in the first cell.

With reference to any implementation manner of the first to the fifth possible implementation manners of the seventh aspect, in a sixth possible implementation manner of the seventh aspect, if the first cell is any cell in the LTE system and the second cell is any cell in the GSM system, the determining, according to an established interference matrix and a spectrum resource real-time occupation status of each second cell, a sum of actual interference of all second cells to the any spectrum resource to be used by the terminal in any area of the first cell includes:

determining a spectrum resource real-time occupation status S of each second cell, where the spectrum resource real-time occupation status S is shown in the following formula:

S={CELL_1(X0, X1, ..., Xi), CELL_2(X0, X1, ..., Xi), ..., CELL_n(X0, X1, ..., Xi)}, where n is a quantity of the second cells and n is any natural number; i indicates a quantity of spectrum resources configured in each second cell and i is any natural number; and Xi indicates a real-time occupation status of the $i^{th}$ spectrum resource configured in each second cell, where it indicates that the spectrum resource is occupied if a value of Xi is 1 and it indicates that the spectrum resource is released if the value is 0;

determining, according to the interference matrix, historical reference interference $I_n$ of each spectrum resource configured in the $n^{th}$ second cell to the terminal in the any area, where $I_n$ is shown in the following formula:

$I_n$=CELL_n(Y0, Y1, ..., Yi), where CELL_n(Yi) indicates historical reference interference of the $i^{th}$ spectrum resource configured in the $n^{th}$ second cell to the terminal in the any area; and determining, by using the following formula, a sum $I_{total}$ of actual interference of all spectrum resources configured in all second cells to any spectrum resource to be used by the terminal in the any area:

$I_{total}$=CELL_1(X0*Y0*θ0+X1*Y1*θ1+...+Xi*Yi*θi)+CELL_2(X0*Y0*θ0+X1*Y1*θ1+...+Xi*Yi*θi)+...+CELL_n(X0*Y0*θ0+X1*Y1*θ1+...+Xi*Yi*θi), where θ indicates an interference weight modification value of each spectrum resource, and CELL_n(Xi*Yi) indicates actual interference of the $i^{th}$ spectrum resource configured in the $n^{th}$ second cell to the any spectrum resource to be used by the terminal in the any area.

According to an eighth aspect, an interference coordination method is provided, including:

before a terminal located in any area of a first cell uses any to-be-used spectrum resource, initiating an interference coordination request to a network-side coordination device for the any to-be-used spectrum resource; and if a first scheduling indication delivered by the network-side coordination device is received, using the any to-be-used spectrum resource; if a second scheduling indication delivered by the network-side coordination device is received, refusing to use the any to-be-used spectrum resource, where the first scheduling indication is delivered by the network-side coordination device to the terminal when the network-side coordination device determines, after receiving the interference coordination request and according to a pre-established interference matrix for representing historical reference interference of each second cell to each area in the first cell and an acquired spectrum resource real-time occupation status of each second cell, that a sum of actual interference of all second cells to the any to-be-used spectrum resource to be used by the terminal does not exceed a preset interference threshold value range; the second scheduling indication is delivered by the network-side coordination device to the terminal when the network-side coordination device determines that the sum of the actual interference of all second cells to the any to-be-used spectrum resource to be used by the terminal exceeds the preset interference threshold value range, where the first cell is any cell in a first system, the second cell is any cell in a second system, and the second cell is a neighboring cell of the first cell.

With reference to the eighth aspect, in a first possible implementation manner of the eighth aspect, the first system and the second system are a combination of any two of GSM, UMTS, LTE, CDMA, TD-SCDMA, and WLAN.

With reference to the eighth aspect or the first possible implementation manner of the eighth aspect, in a second possible implementation manner of the eighth aspect, before, at the same time when, or after the terminal initiates the interference coordination request to the network-side coordination device, the method further includes:

reporting measurement information to the network-side coordination device in real time or regularly, where the measurement information includes any one or more of signal strength of a signal received by the terminal from each second cell, signal quality of the signal received by the terminal from each second cell, a distance between each second cell and a location of the terminal, and a signal loss of a signal transmitted from each second cell to the location of the terminal.

According to a ninth aspect, an interference coordination method is provided, including:

acquiring, by a control device in a second cell, a spectrum resource real-time occupation status of the second cell; and reporting the acquired spectrum resource real-time occupation status to a network-side coordination device, so that the network-side coordination device determines, when receiving an interference coordination request initiated by a terminal located in any area of a first cell for any to-be-used spectrum resource, and according to a pre-established interference matrix for representing historical reference interference of each second cell to each area in the first cell and the acquired spectrum resource real-time occupation status of each second cell, a sum of actual interference of all second cells to the any to-be-used spectrum resource to be used by the terminal, and delivers a first scheduling indication to the terminal when determining that the sum of the actual interference does not exceed a preset interference threshold value range, to indicate that the terminal can use the any to-be-used spectrum resource; or delivers a second scheduling indication to the terminal when determining that the sum of the actual interference exceeds a preset interference threshold value range, to indicate that the terminal cannot use the any to-be-used spectrum resource, where the first cell is any cell in a first system, the second cell is any cell in a second system, and the second cell is a neighboring cell of the first cell.

With reference to the ninth aspect, in a first possible implementation manner of the ninth aspect, the first system and the second system are a combination of any two of GSM, UMTS, LTE, CDMA, TD-SCDMA, and WLAN.

In the technical solutions of the embodiments of the present invention, for a terminal located in any area of a first cell, it can be determined, according to a pre-established interference matrix for representing historical reference interference of each second cell to each area in the first cell and a spectrum resource real-time occupation status of each second cell, a sum of actual interference of all second cells to any spectrum resource to be used by the terminal; when it is determined that the sum of the actual interference does not exceed a preset interference threshold value range, it is determined that the terminal can use the any spectrum resource, or when it is determined that the sum of the actual interference exceeds a preset interference threshold value range, it is determined that the terminal cannot use the any spectrum resource, where the first cell is any cell in a first system, the second cell is any cell in a second system, and the second cell is a neighboring cell of the first cell. In this way, systems with different standards can be deployed at a same frequency at the same time, and spectrum resources can be alternately used or simultaneously used between the different standards according to an interference coordination method in a frequency domain, thereby greatly improving spectrum utilization.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Embodiments of the present invention provide an interference coordination method and device. In the technical solutions of the embodiments of the present invention, a network-side coordination device may determine, after receiving an interference coordination request initiated by a terminal located in any area of a first cell for any to-be-used spectrum resource, and according to a pre-established interference matrix for representing historical reference interference of each second cell to each area in the first cell and an acquired spectrum resource real-time occupation status of each second cell, a sum of actual interference of all second cells to the any to-be-used spectrum resource to be used by the terminal; and deliver a first scheduling indication to the terminal when determining that the sum of the actual interference does not exceed a preset interference threshold value range, to indicate that the terminal can use the any to-be-used spectrum resource, or deliver a second scheduling indication to the terminal when determining that the sum of the actual interference exceeds a preset interference threshold value range, to indicate that the terminal cannot use the any to-be-used spectrum resource, where the first cell is any cell in a first system, the second cell is any cell in a second system, and the second cell is a neighboring cell of the first cell. In this way, systems with different standards can be deployed at a same frequency at the same time, and spectrum resources can be alternately used or simultaneously used between the different standards according to an interference coordination method in a frequency domain, thereby greatly improving spectrum utilization.

Specifically, it should be noted that, in the embodiments of the present invention, the first system and the second system may be generally a combination of any two of GSM, UMTS, LTE, CDMA, TD-SCDMA and WLAN, which are not limited in the embodiments of the present invention. Specifically, for ease of description, in the embodiments of the present invention, exemplary description is made by using an example in which the first system is an LTE system and the second system is a GSM system.

To make the objectives, technical solutions, and advantages of the present invention clearer, the following further describes the present invention in detail with reference to the accompanying drawings. Apparently, the described embodiments are merely some rather than all of the embodiments of the present invention. All other embodiments obtained by a person of ordinary skill in the art based on the embodiments of the present invention without creative efforts shall fall within the protection scope of the present invention.

Embodiment 1

Figure 1:
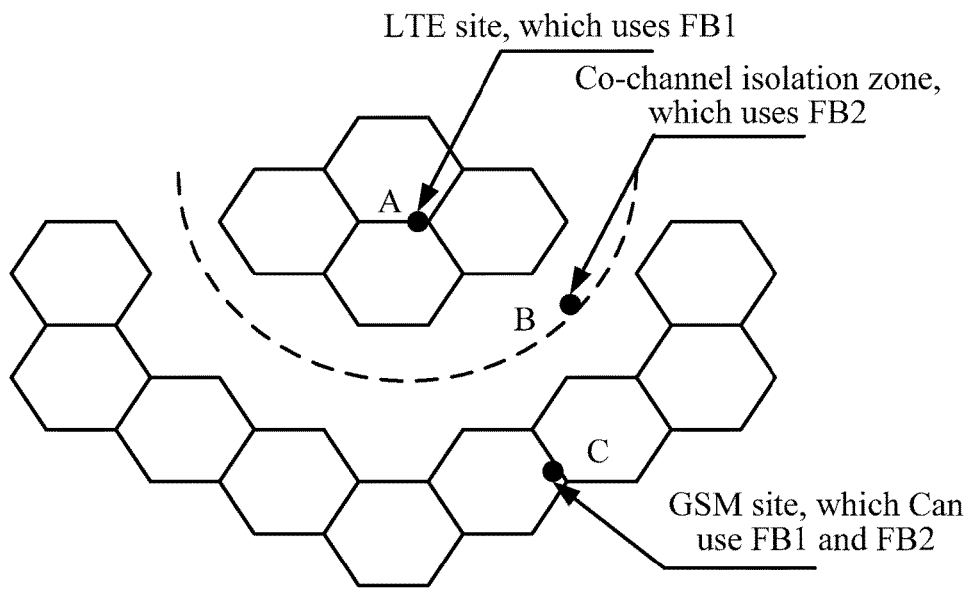
FIG. 1 is a schematic structural diagram showing GL Refarming deployment in the prior art.
Figure 2:
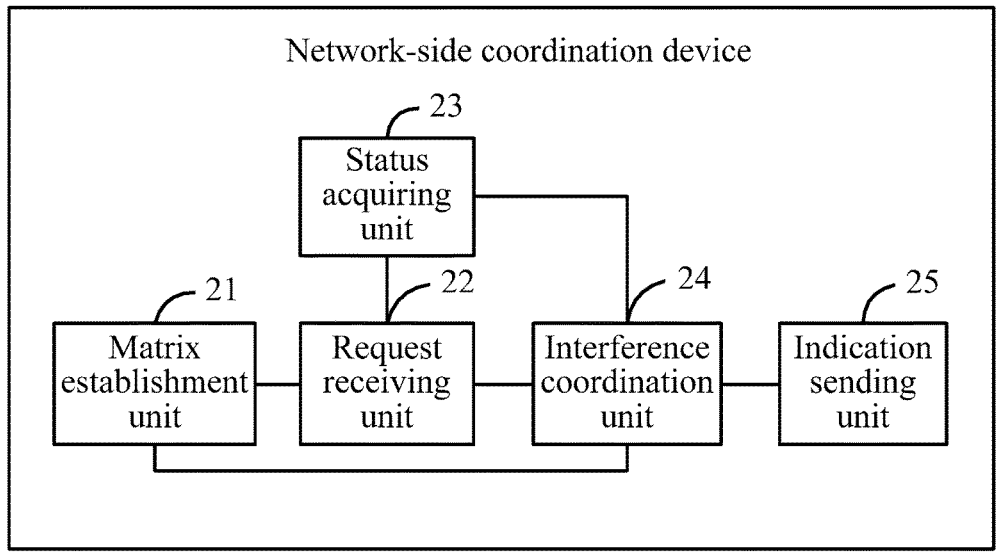
FIG. 2 is a first schematic structural diagram of a network-side coordination device according to Embodiment 1 of the present invention.

Embodiment 1 of the present invention provides a network-side coordination device, where the network-side coordination device is not limited to a device such as an RNC (Radio Network Controller, radio network controller), an eNB (Evolved Node B, evolved nodeB), or a BSC (Base Station Controller, base station controller) at a network side, which is not limited in this embodiment of the present invention. Specifically, as shown in FIG. 2, FIG. 2 is a schematic structural diagram of a network-side coordination device. The network-side coordination device may include a matrix establishment unit 21, a request receiving unit 22, a status acquiring unit 23, an interference coordination unit 24, and an indication sending unit 25.

The matrix establishment unit 21 may be configured to pre-establish an interference matrix for representing historical reference interference of each second cell to each area in a first cell, where, as described above, the first cell is any cell in a first system, the second cell is any cell in a second system, and the second cell is a neighboring cell of the first cell.

The request receiving unit 22 may be configured to receive an interference coordination request initiated by a terminal located in any area of the first cell, where the interference coordination request is initiated to the network-side coordination device before the terminal uses any to-be-used spectrum resource. It should be noted that, in this embodiment of the present invention, the any spectrum resource to be used by the terminal in the first cell may generally refer to any spectrum resource in spectrum resources that are at the same frequency with spectrum resources configured in the second cell, which is not described in detail in this embodiment of the present invention. Certainly, it should be noted that, the any spectrum resource to be used by the terminal in the first cell may also refer to any spectrum resource in spectrum resources that are at different frequencies from spectrum resources configured in the second cell, which is not limited in this embodiment of the present invention.

The status acquiring unit 23 may be configured to acquire a spectrum resource real-time occupation status of each second cell. Specifically, the status acquiring unit 23 may be configured to acquire the spectrum resource real-time occupation status of each second cell in a manner of delivering a spectrum resource status acquiring instruction to a control device of each second cell and receiving a response message that carries corresponding spectrum resource real-time occupation status information and is returned by the control device of each second cell; or may be configured to acquire the spectrum resource real-time occupation status of each second cell in a manner of receiving spectrum resource real-time occupation status information of each second cell that is reported actively by a control device of each second cell, which is not limited in this embodiment of the present invention. The control device of the second cell may be a device such as a serving base station of the second cell, which is not described in detail in this embodiment of the present invention.

The interference coordination unit 24 may be configured to determine, at the same time when or after the interference coordination request initiated by the terminal located in any area of the first cell is received, and according to the interference matrix pre-established by the matrix establishment unit 21 and for representing the historical reference interference of each second cell to each area in the first cell and the spectrum resource real-time occupation status of each second cell acquired by the status acquiring unit 23, a sum of actual interference of all second cells to the any to-be-used spectrum resource to be used by the terminal; determine whether the determined sum of the actual interference does not exceed a preset interference threshold value range; and if yes, trigger the indication sending unit 25 to deliver a first scheduling indication to the terminal, or if not, trigger the indication sending unit 25 to deliver a second scheduling indication to the terminal.

The indication sending unit 25 may be configured to deliver, as triggered by the interference coordination unit 24, the first scheduling indication to the terminal, to indicate that the terminal can use the any to-be-used spectrum resource; or deliver, as triggered by the interference coordination unit 24, the second scheduling indication to the terminal, to indicate that the terminal cannot use the any to-be-used spectrum resource.

Specifically, in either the GSM system or the LTE system, traffic distribution characteristics of users in a cell are relatively fixed and are periodical, and locations and transmit power of cell sites in the system are also relatively fixed. Therefore, traffic model data of a cell may be acquired by using measurement information reported by each terminal in the GSM system or the LTE system, and then an interference matrix capable of representing an interference relationship between the GSM system and the LTE system is constructed according to the acquired measurement information or the traffic model data.

Specifically, in this embodiment of the present invention, by using the interference matrix for representing the historical reference interference of each second cell to each area in the first cell as an example, the interference matrix for representing the historical reference interference of each second cell to each area in the first cell may be established by the matrix establishment unit 21 based on the measurement information that is reported by each terminal in the first cell within a set time period and collected in advance. The measurement information may specifically include any one or more of signal strength of a signal received by each terminal in the first cell from each second cell, signal quality of the signal received by each terminal in the first cell from each second cell, a distance between each second cell and a location of each terminal in the first cell, and a signal loss of a signal transmitted from each second cell to the location of each terminal in the first cell, which are not limited in this embodiment of the present invention. In addition, it should be noted that, the interference matrix for representing the historical reference interference of each second cell to each area in the first cell may also be established by the matrix establishment unit 21 based on measurement information reported by each terminal in the second cell that is co-site and co-coverage with the first cell, which is not limited in this embodiment of the present invention.

Further, still by using the interference matrix for representing the historical reference interference of each second cell to each area in the first cell as an example, the matrix establishment unit 21 may be specifically configured to establish, by using the following steps and based on the measurement information that is reported by each terminal in the first cell within a set time period and collected in advance, the interference matrix for representing the historical reference interference of each second cell to each area in the first cell:

Step S1: Divide a cell coverage area of the first cell into N sub-areas according to a set area division rule, where N is any natural number; specifically, the cell coverage area of the first cell may be divided into the N sub-areas according to a distance between each area in the cell coverage area of the first cell and a serving base station of the first cell, signal strength of a signal received by each area in the cell coverage area of the first cell from the serving base station of the first cell, signal quality of the signal received by each area in the cell coverage area of the first cell from the serving base station of the first cell, a path loss from the serving base station of the first cell to each area in the cell coverage area of the first cell, and the like, which are not limited in this embodiment of the present invention. It should be noted that, preferably, N is generally a natural number greater than 1, which is not described in detail in this embodiment of the present invention.

Step S2: For any sub-area, determine, according to the measurement information that is reported by each terminal in the first cell and collected in the set time period (which specifically may be measurement information that is collected in the set time period and reported by each terminal located in the any sub-area), historical reference interference of each spectrum resource configured in each second cell to the any sub-area, and generate, according to the determined historical reference interference of each spectrum resource configured in each second cell to the any sub-area, an interference sub-matrix corresponding to the any sub-area.

An expression manner of the historical reference interference of each second cell to each area in the first cell may at least include: any one or more of signal strength of a signal transmitted from each second cell when the signal arrives at each area in the first cell, signal quality of the signal transmitted from each second cell when the signal arrives at each area in the first cell, a distance between each second cell and each area in the first cell, and a signal loss of a signal transmitted from each second cell when the signal arrives at each area in the first cell, which are not limited in this embodiment of the present invention.

Step S3: Use an interference sub-matrix set formed by all determined interference sub-matrixes corresponding to all sub-areas as the established interference matrix for representing the historical reference interference of each second cell to each area in the first cell.

Figure 3:
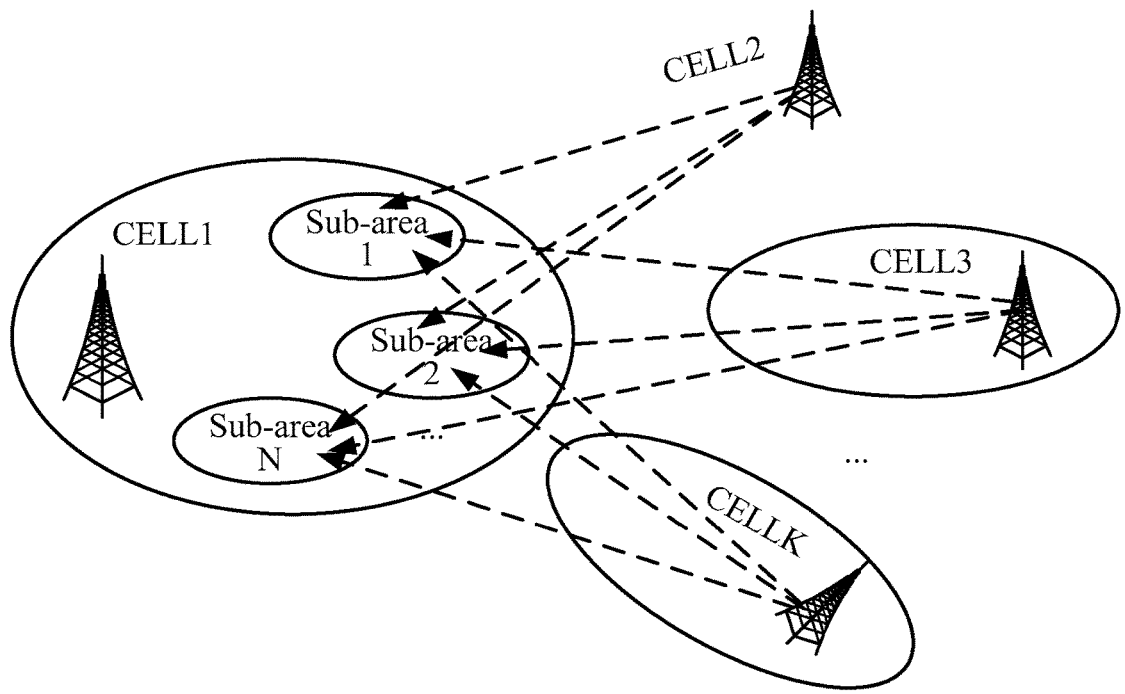
FIG. 3 is a schematic diagram showing a relationship of interference of each second cell to each area in a first cell according to Embodiment 1 of the present invention.

For example, as shown in FIG. 3, a cell coverage area of CELL1 (that is, the first cell) is divided into a sub-area 1, a sub-area 2, . . . , and a sub-area N; and interference relationship data between CELL1 and each of neighboring cells CELL2, CELL3, . . . and CELLK (the CELL2, CELL3, . . . and CELLK are second cells, and K is any natural number greater than or equal to 1) in the sub-area 1, interference relationship data between CELL1 and each of the neighboring cells CELL2, CELL3, . . . and CELLK in the sub-area 2, . . . , and interference relationship data between CELL1 and each of the neighboring cells CELL2, CELL3, . . . and CELLK in the sub-area N are collected, so as to form an interference matrix between cells at different locations. The interference sub-matrix corresponding to each sub-area may reflect an interference impact of each of the neighboring cells CELL2, CELL3, . . . and CELLK on CELL1 in this sub-area, where the interference impact may be expressed as quality, a distance, a level, a path loss, or the like. A set of interference sub-matrixes corresponding to all sub-areas obtained after division in a cell converge area forms an interference matrix of this cell. Similarly, each cell may determine, according to the foregoing interference matrix determining manner, an interference matrix for representing historical reference interference of each surrounding neighboring cell to each area in the cell, which is not described in detail in this embodiment of the present invention.

Further, it should be noted that, in this embodiment of the present invention, after pre-establishing the interference matrix, the matrix establishment unit 21 may further collect, in real time or regularly, the measurement information that is reported by each terminal in the first cell (or the measurement information reported by each terminal in the second cell that is co-site and co-coverage with the first cell), and update the pre-established interference matrix based on the measurement information that is reported by each terminal in the first cell and collected in real time or regularly (or the measurement information reported by each terminal in the second cell that is co-site and co-coverage with the first cell), which is not described in detail in this embodiment of the present invention. For example, a system using an SON (Self-Organizing Network, self-organizing network) architecture can continually collect and update interference matrix data in a cell automatically, so as to achieve an objective of updating the interference matrix data in the cell in real time or regularly.

In addition, it should be noted that, in this embodiment of the present invention, the matrix establishment unit 21 may also construct the interference matrix based on a corresponding simulation result in addition to the measurement information of a current network, where the corresponding simulation result is obtained by the matrix establishment unit by performing level coverage predication with a simulation tool so as to simulate a topological structure of the current network and a signal transmission feature, which is not described in detail in this embodiment of the present invention.

Further, still by using the interference matrix for representing the historical reference interference of each second cell to each area in the first cell, after the foregoing interference matrix is obtained, it may be determined, according to the corresponding interference matrix and the acquired spectrum resource real-time occupation status of each second cell, a sum of actual interference of all second cells to any spectrum resource to be used by the terminal located in any area of the first cell.

Specifically, by using an example in which the first cell is any cell in the LTE system and the second cell is any cell in the GSM system, the interference coordination unit 24 may be specifically configured to determine, in the following manner, and according to the established interference matrix for representing the historical reference interference of each second cell to each area in the first cell and the spectrum resource real-time occupation status of each second cell, the sum of actual interference of all second cells to any spectrum resource to be used by the terminal located in any area of the first cell:

determining a spectrum resource real-time occupation status S of each second cell, where the spectrum resource real-time occupation status S may be shown in the following formula:

S={CELL_1(X0, X1, . . . , Xi), CELL_2(X0, X1, . . . , Xi), . . . , CELL_n(X0, X1, . . . , Xi)}, where n is a quantity of the second cells and n is any natural number, i indicates a quantity of spectrum resources configured in each second cell and i is any natural number, and Xi indicates a real-time occupation status of the $i^{th}$ spectrum resource configured in each second cell, where it indicates that the spectrum resource is occupied if a value of Xi is 1 and it indicates that the spectrum resource is released if the value is 0;

determining, according to the interference matrix, historical reference interference $I_n$ of each spectrum resource configured in the $n^{th}$ second cell to the terminal in the any area, where $I_n$ may be shown in the following formula:

$I_n$=CELL_n(Y0, Y1, . . . , Yi), where CELL_n(Yi) indicates historical reference interference of the $i^{th}$ spectrum resource configured in the $n^{th}$ second cell to the terminal in the any area; and determining, by using the following formula, a sum $I_{total}$ of actual interference of all spectrum resources configured in all second cells to any spectrum resource to be used by the terminal in the any area:

$I_{total}$=CELL_1(X0*Y0*θ0+X1*Y1*θ1+ . . . +Xi*Yi*θi)+ CELL_2(X0*Y0*θ0+X1*Y1*θ1+ . . . +Xi*Yi*θi)+ . . . + CELL_n(X0*Y0*θ0+X1*Y1*θ1+ . . . +Xi*Yi*θi), where θ indicates an interference weight modification value of each spectrum resource, and CELL_n(Xi*Yi) indicates actual interference of the $i^{th}$ spectrum resource configured in the $n^{th}$ second cell to the any spectrum resource to be used by the terminal in the any area, where specifically, the interference weight modification value corresponding to each spectrum resource configured in each second cell may be generally determined according to different interfering cells in a historically collected data sample and a prediction error between interference at a different interfering frequency in each cell and actual interference, so as to correspondingly modify the interference according to an actual condition, so that finally calculated interference approaches actual interference.

It can be known from the foregoing content that, in order to accurately estimate a condition of interference of each second cell to a terminal at a certain location of the first cell, a resource actually used by each second cell needs to be taken into consideration. Specifically, for a GSM cell, interference generated when a user occupies a carrier configured in the GSM cell is different from that generated when no user occupies the carrier, and interference generated when only one user occupies the carrier is also different from that generated when multiple users occupy the carrier; and a total of adding interference powers needs to be taken into consideration if multiple carriers configured in the GSM cell are all occupied. Similarly, LTE bandwidth includes multiple RB resources, and interference to the GSM is also different if the LTE uses a different RB resource. Therefore, during calculation of interference of each GSM cell in the GSM system to each LTE cell in the LTE system, it is required to know conditions about the carrier occupied in the GSM cell and the user occupying each carrier; correspondingly, during calculation of interference of each LTE cell in the LTE system to each GSM cell in the GSM system, it is required to know an RB occupation condition in each LTE cell.

Further, after determining the sum of actual interference of all second cells to the any to-be-used spectrum resource to be used by the terminal, the interference coordination unit 24 may immediately execute an operation of determining whether the determined sum of the actual interference does not exceed a preset interference threshold value range.

Specifically, in this embodiment of the present invention, the determining whether the determined sum of the actual interference does not exceed a preset interference threshold value range may generally refer to: determining whether the determined sum of the actual interference falls within a numeric value interval defined by the preset interference threshold value range.

For example, when an expression manner of the historical reference interference or the actual interference of each second cell to each area in the first cell is an expression manner in which a larger numeric value of signal strength of a signal transmitted from each second cell when the signal arrives at each area in the first cell or signal quality of a signal transmitted from each second cell when the signal arrives at each area in the first cell indicates greater intensity of interference suffered by the terminal, the interference threshold value range generally refers to a numeric value interval in which numeric values are not greater than a set first interference threshold. In such a case, when it is determined that the sum of the actual interference is not greater than the set first interference threshold, it may be considered that the sum of the actual interference does not exceed the set interference threshold value range; or when it is determined that the sum of the actual interference is greater than the set first interference threshold, it may be considered that the sum of the actual interference exceeds the set interference threshold value range.

For another example, when an expression manner of the historical reference interference or the actual interference of each second cell to each area in the first cell is an expression manner in which a larger numeric value of a distance between each second cell and each area in the first cell or a signal loss of a signal transmitted from each second cell when the signal arrives at each area in the first cell indicates smaller intensity of interference suffered by the terminal, the interference threshold value range generally refers to a numeric value interval in which numeric values are not less than a set second interference threshold. In such a case, when it is determined that the sum of the actual interference is not less than the set second interference threshold, it may be considered that the sum of the actual interference does not exceed the set interference threshold value range; correspondingly, when it is determined that the sum of the actual interference is less than the set second interference threshold, it may be considered that the sum of the actual interference exceeds the set interference threshold value range.

Further, it should be noted that, in this embodiment of the present invention, the set interference threshold value range may be adjusted and set according to a service type of the terminal, which is not limited in this embodiment of the present invention.

In addition, it should be noted that, in this embodiment of the present invention, whether the terminal can use any spectrum resource in all spectrum resources configured in the second cell may be determined based on the preset interference matrix for representing the historical reference interference of each second cell to each area in the first cell and the spectrum resource real-time occupation status of each second cell; or whether the terminal can use the any spectrum resource may also be determined in a manner of measuring, in a certain measurement period and in real time, a value of adding real-time interference of all second cells to any spectrum resource to be used by the terminal located in any area of the first cell, which is not limited in this embodiment of the present invention.

For example, by using LTE as an example, interference energy suffered by each RB or RBG on a shared spectrum (that is, a spectrum resource configured in the GSM cell) is measured in real time in a certain measurement period, and if the interference energy suffered by the RB or RBG exceeds the set interference threshold value range, it may be considered that the RB or RBG cannot be scheduled; and until it is measured in a certain measurement period that the interference energy suffered by the RB or RBG does not exceed the set interference threshold value range, it may be considered that the RB or RBG can be scheduled.

Figure 4:
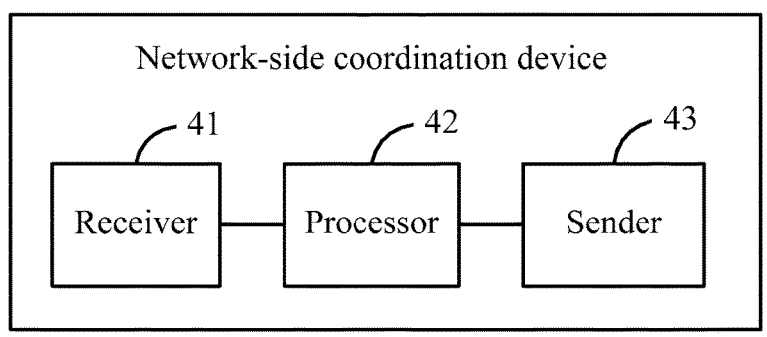
FIG. 4 is a second schematic structural diagram of a network-side coordination device according to Embodiment 1 of the present invention.

Further, this embodiment of the present invention further provides another network-side coordination device (that is, a physical network-side coordination device) that is based on the same invention concept with the network-side coordination device shown in FIG. 2. As shown in FIG. 4, FIG. 4 is a schematic structural diagram of another network-side coordination device according to Embodiment 1 of the present invention. The network-side coordination device may include a receiver 41, a processor 42, and a sender 43.

The receiver 41 may be configured to receive an interference coordination request initiated by a terminal located in any area of a first cell, where the interference coordination request is initiated to the network-side coordination device before the terminal uses any to-be-used spectrum resource.

The processor 42 may be configured to pre-establish an interference matrix for representing historical reference interference of each second cell to each area in the first cell; acquire a spectrum resource real-time occupation status of each second cell; determine, according to the pre-established interference matrix and the acquired spectrum resource real-time occupation status of each second cell, a sum of actual interference of all second cells to the any to-be-used spectrum resource to be used by the terminal; determine whether the determined sum of the actual interference does not exceed a preset interference threshold value range; and if yes, trigger the sender 43 to deliver a first scheduling indication to the terminal, or if not, trigger the sender 43 to deliver a second scheduling indication to the terminal.

The sender 43 may be configured to deliver, as triggered by the processor 42, the first scheduling indication to the terminal, to indicate that the terminal can use the any to-be-used spectrum resource; or deliver, as triggered by the processor 42, the second scheduling indication to the terminal, to indicate that the terminal cannot use the any to-be-used spectrum resource.

The first cell is any cell in a first system, the second cell is any cell in a second system, and the second cell is a neighboring cell of the first cell.

Specifically, the processor 42 may be specifically configured to establish the interference matrix based on measurement information that is reported by each terminal in the first cell within a set time period and collected in advance.

The measurement information may specifically include any one or more of signal strength of a signal received by each terminal in the first cell from each second cell, signal quality of the signal received by each terminal in the first cell from each second cell, a distance between each second cell and a location of each terminal in the first cell, and a signal loss of a signal transmitted from each second cell to the location of each terminal in the first cell.

Further, the processor 42 may be further configured to collect, in real time or regularly, the measurement information that is reported by each terminal in the first cell, and update the pre-established interference matrix based on the measurement information that is reported by each terminal in the first cell and collected in real time or regularly.

Further, the processor 42 may be specifically configured to divide a cell coverage area of the first cell into N sub-areas according to a set area division rule, where N is any natural number; for any sub-area, determine, according to the measurement information that is reported by each terminal in the first cell and collected in the set time period, historical reference interference of each spectrum resource configured in each second cell to the any sub-area; generate, according to the determined historical reference interference of each spectrum resource configured in each second cell to the any sub-area, an interference sub-matrix corresponding to the any sub-area; and use an interference sub-matrix set formed by all determined interference sub-matrixes corresponding to all sub-areas as the established interference matrix for representing the historical reference interference of each second cell to each area in the first cell.

An expression manner of the historical reference interference or actual interference of each second cell to each area in the first cell may at least include:

any one or more of signal strength of a signal transmitted from each second cell when the signal arrives at each area in the first cell, signal quality of the signal transmitted from each second cell when the signal arrives at each area in the first cell, a distance between each second cell and each area in the first cell, and a signal loss of a signal transmitted from each second cell when the signal arrives at each area in the first cell.

Further, by using an example in which the first cell is any cell in the LTE system and the second cell is any cell in the GSM system, the processor 42 may be specifically configured to:

determine a spectrum resource real-time occupation status S of each second cell, where the spectrum resource real-time occupation status S is shown in the following formula:

S={CELL_1(X0, X1, . . . , Xi), CELL_2(X0, X1, . . . , Xi), . . . , CELL_n(X0, X1, . . . , Xi)}, where n is a quantity of the second cells and n is any natural number, i indicates a quantity of spectrum resources configured in each second cell and i is any natural number, and Xi indicates a real-time occupation status of the $i^{th}$ spectrum resource configured in each second cell, where it indicates that the spectrum resource is occupied if a value of Xi is 1 and it indicates that the spectrum resource is released if the value is 0;

determine, according to the interference matrix, historical reference interference $I_n$ of each spectrum resource configured in the $n^{th}$ second cell to the terminal in the any area, where $I_n$ may be shown in the following formula:

$I_n$=CELL_n(Y0, Y1, . . . , Yi), where CELL_n(Yi) indicates historical reference interference of the $i^{th}$ spectrum resource configured in the $n^{th}$ second cell to the terminal in the any area; and determine, by using the following formula, a sum $I_{total}$ of actual interference of all spectrum resources configured in all second cells to any spectrum resource to be used by the terminal in the any area:

$I_{total}$=CELL_1(X0*Y0*θ0+X1*Y1*θ1+ . . . +Xi*Yi*θi)+ CELL_2(X0*Y0*θ0+X1*Y1*θ1+ . . . +Xi*Yi*θi)+ . . . + CELL_n(X0*Y0*θ0+X1*Y1*θ1+ . . +Xi*Yi*θi), where θ indicates an interference weight modification value of each spectrum resource, and CELL_n(Xi*Yi) indicates actual interference of the $i^{th}$ spectrum resource configured in the $n^{th}$ second cell to the any spectrum resource to be used by the terminal in the any area.

Embodiment 1 of the present invention provides a network-side coordination device. In the technical solutions of Embodiment 1 of the present invention, for a terminal located in any area of a first cell, the network-side coordination device may determine, according to a pre-established interference matrix for representing historical reference interference of each second cell to each area in the first cell and a spectrum resource real-time occupation status of each second cell, a sum of actual interference of all second cells to any spectrum resource to be used by the terminal; determine that the terminal can use the any spectrum resource when determining that the sum of the actual interference does not exceed a preset interference threshold value range, or determine that the terminal cannot use the any spectrum resource when determining that the sum of the actual interference exceeds a preset interference threshold value range, where the first cell is any cell in a first system, the second cell is any cell in a second system, and the second cell is a neighboring cell of the first cell. In this way, systems with different standards can be deployed at a same frequency at the same time, and spectrum resources can be alternately used or simultaneously used between the different standards according to an interference coordination method in a frequency domain, thereby greatly improving spectrum utilization; moreover, LTE with higher system bandwidth can be deployed without the need of purchasing a new spectrum, thereby providing a more competitive network for a terminal user.

Embodiment 2

Figure 5:
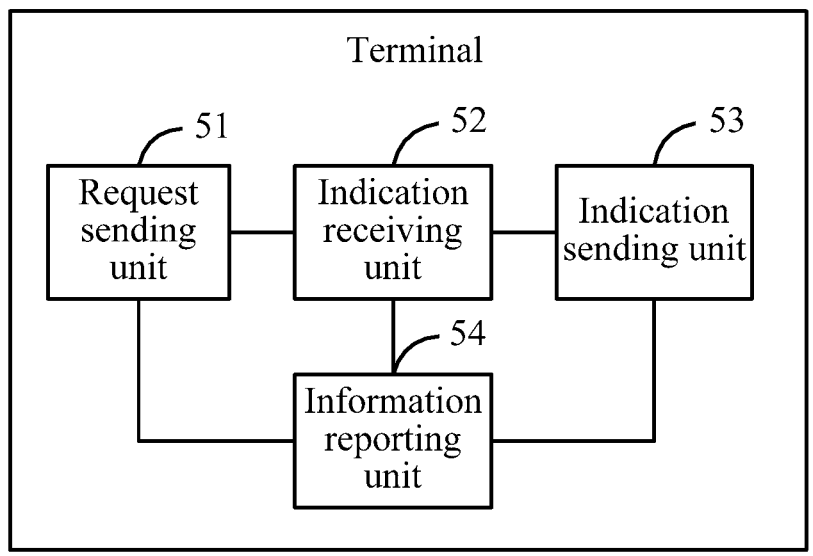
FIG. 5 is a first schematic structural diagram of a terminal according to Embodiment 2 of the present invention.

Embodiment 2 of the present invention provides a terminal that can perform information interaction with the network-side device described in Embodiment 1 of the present invention. As shown in FIG. 5, FIG. 5 is a schematic structural diagram of the terminal according to Embodiment 2 of the present invention. The terminal may include a request sending unit 51, an indication receiving unit 52, and an indication sending unit 53.

The request sending unit 51 may be configured to: when the terminal is located in any area of a first cell and before the terminal uses any to-be-used spectrum resource, initiate an interference coordination request to a network-side coordination device for the any to-be-used spectrum resource. It should be noted that, in this embodiment of the present invention, the any spectrum resource to be used by the terminal may generally refer to any spectrum resource in spectrum resources that are at the same frequency with spectrum resources configured in the second cell, which is not described in detail in this embodiment of the present invention. Certainly, it should be noted that, the any spectrum resource to be used by the terminal may also refer to any spectrum resource in spectrum resources that are at different frequencies from spectrum resources configured in the second cell, which is not limited in this embodiment of the present invention. As described above, the first cell is any cell in a first system, the second cell is any cell in a second system, and the second cell is a neighboring cell of the first cell.

The indication receiving unit 52 may be configured to receive a first scheduling indication or a second scheduling indication delivered by the network-side coordination device, where the first scheduling indication may be delivered by the network-side coordination device to the terminal when the network-side coordination device determines, after receiving the interference coordination request and according to a pre-established interference matrix for representing historical reference interference of each second cell to each area in the first cell and an acquired spectrum resource real-time occupation status of each second cell, that a sum of actual interference of all second cells to the any to-be-used spectrum resource to be used by the terminal does not exceed a preset interference threshold value range; the second scheduling indication is delivered by the network-side coordination device to the terminal when the network-side coordination device determines that the sum of the actual interference of all second cells to the any to-be-used spectrum resource to be used by the terminal exceeds the preset interference threshold value range.

The indication processing unit 53 may be configured to use the any to-be-used spectrum resource according to the first scheduling indication when the indication receiving unit 52 receives the first scheduling indication delivered by the network-side coordination device; or may be configured to refuse to use the any to-be-used spectrum resource according to the second scheduling indication when the indication receiving unit 52 receives the second scheduling indication delivered by the network-side coordination device.

Further, it should be noted that, in this embodiment of the present invention, the terminal may further include an information reporting unit 54.

The information reporting unit 54 may be configured to: before, at the same time when, or after the terminal initiates the interference coordination request to the network-side coordination device, report measurement information to the network-side coordination device in real time or regularly, so that the network-side coordination device can perform, according to the measurement information reported by the information reporting unit 54, an operation such as pre-establishing a corresponding interference matrix or correspondingly updating the pre-established interference matrix, which is not described in detail in this embodiment of the present invention.

The measurement information may include any one or more of signal strength of a signal received by the terminal from each second cell, signal quality of the signal received by the terminal from each second cell, a distance between each second cell and a location of the terminal, and a signal loss of a signal transmitted from each second cell to the location of the terminal.

Figure 6:
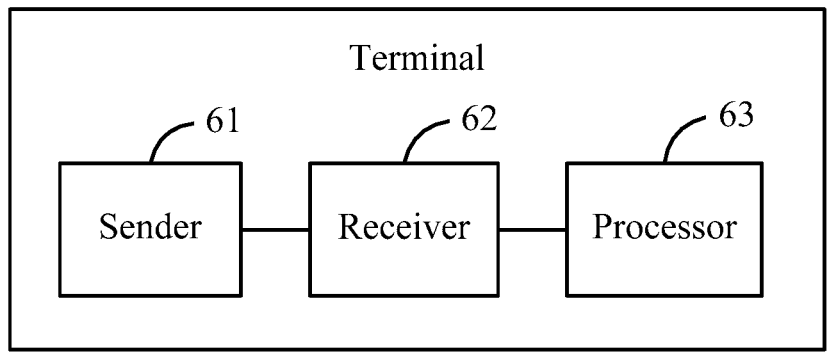
FIG. 6 is a second schematic structural diagram of a terminal according to Embodiment 2 of the present invention.

Further, Embodiment 2 of the present invention further provides another terminal (that is, a physical terminal) that is based on a same invention concept with the terminal shown in FIG. 5. As shown in FIG. 6, FIG. 6 is a schematic structural diagram of another terminal according to Embodiment 2 of the present invention. The terminal may include a sender 61, a receiver 62, and a processor 63.

The sender 61 may be configured to: when the terminal is located in any area of a first cell and before the terminal uses any to-be-used spectrum resource, initiate an interference coordination request to a network-side coordination device for the any to-be-used spectrum resource.

The receiver 62 may be configured to receive a first scheduling indication or a second scheduling indication delivered by the network-side coordination device, where the first scheduling indication may be delivered by the network-side coordination device to the terminal when the network-side coordination device determines, after receiving the interference coordination request and according to a pre-established interference matrix for representing historical reference interference of each second cell to each area in the first cell and an acquired spectrum resource real-time occupation status of each second cell, that a sum of actual interference of all second cells to the any to-be-used spectrum resource to be used by the terminal does not exceed a preset interference threshold value range; the second scheduling indication may be delivered by the network-side coordination device to the terminal when the network-side coordination device determines that the sum of the actual interference of all second cells to the any to-be-used spectrum resource to be used by the terminal exceeds the preset interference threshold value range; the first cell is any cell in a first system, the second cell is any cell in a second system, and the second cell is a neighboring cell of the first cell.

The processor 63 may be configured to: when the receiver 62 receives the first scheduling indication delivered by the network-side coordination device, use the any to-be-used spectrum resource according to the first scheduling indication; or may be configured to: when the receiver 62 receives the second scheduling indication delivered by the network-side coordination device, refuse to use the any to-be-used spectrum resource according to the second scheduling indication.

Specifically, in this embodiment of the present invention, the sender 61 may be further configured to: before, at the same time when, or after the terminal initiates the interference coordination request to the network-side coordination device, report measurement information to the network-side coordination device in real time or regularly, so that the network-side coordination device can perform, according to the measurement information reported by the sender 61, an operation such as pre-establishing a corresponding interference matrix or correspondingly updating the pre-established interference matrix, which is not described in detail in this embodiment of the present invention.

The measurement information may specifically include any one or more of signal strength of a signal received by the terminal from each second cell, signal quality of the signal received by the terminal from each second cell, a distance between each second cell and a location of the terminal, and a signal loss of a signal transmitted from each second cell to the location of the terminal.

Embodiment 2 of the present invention provides a terminal that can perform information interaction with the network-side device described in Embodiment 1 of the present invention. In the technical solutions of Embodiment 2 of the present invention, for a terminal located in any area of a first cell, before using any to-be-used spectrum resource, the terminal may initiate an interference coordination request to a network-side coordination device for the any to-be-used spectrum resource, and use, after receiving a first scheduling indication delivered by the network-side coordination device, the any to-be-used spectrum resource according to the first scheduling indication; or refuse to use, after receiving a second scheduling indication delivered by the network-side coordination device, the any to-be-used spectrum resource according to the second scheduling indication, where the first scheduling indication may be delivered by the network-side coordination device to the terminal when the network-side coordination device determines, after receiving the interference coordination request and according to a pre-established interference matrix for representing historical reference interference of each second cell to each area in the first cell and an acquired spectrum resource real-time occupation status of each second cell, that a sum of actual interference of all second cells to the any to-be-used spectrum resource to be used by the terminal does not exceed a preset interference threshold value range; the second scheduling indication may be delivered by the network-side coordination device to the terminal when the network-side coordination device determines that the sum of the actual interference of all second cells to the any to-be-used spectrum resource to be used by the terminal exceeds the preset interference threshold value range; the first cell is any cell in a first system, the second cell is any cell in a second system, and the second cell is a neighboring cell of the first cell. In this way, systems with different standards can be deployed at a same frequency at the same time, and spectrum resources can be alternately used or simultaneously used between the different standards according to an interference coordination method in a frequency domain, thereby greatly improving spectrum utilization; moreover, LTE with higher system bandwidth can be deployed without the need of purchasing a new spectrum, thereby providing a more competitive network for a terminal user.

Embodiment 3

Figure 7:
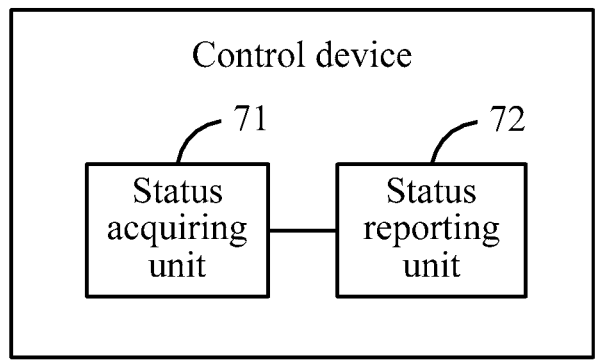
FIG. 7 is a first schematic structural diagram of a control device according to Embodiment 3 of the present invention.

Embodiment 3 of the present invention provides a control device that can perform information interaction with the network-side device described in Embodiment 1 of the present invention. As shown in FIG. 7, FIG. 7 is a schematic structural diagram of the control device in Embodiment 3 of the present invention. The control device may include a status acquiring unit 71 and a status reporting unit 72.

The status acquiring unit 71 may be configured to acquire a spectrum resource real-time occupation status of a second cell.

The status reporting unit 72 may be configured to report the spectrum resource real-time occupation status acquired by the status acquiring unit 71 to a network-side coordination device, so that the network-side coordination device determines, when receiving an interference coordination request initiated by a terminal located in any area of a first cell for any to-be-used spectrum resource, and according to a pre-established interference matrix for representing historical reference interference of each second cell to each area in the first cell and the acquired spectrum resource real-time occupation status of each second cell, a sum of actual interference of all second cells to the any to-be-used spectrum resource to be used by the terminal, and delivers a first scheduling indication to the terminal when determining that the sum of the actual interference does not exceed a preset interference threshold value range, to indicate that the terminal can use the any to-be-used spectrum resource; or delivers a second scheduling indication to the terminal when determining that the sum of the actual interference exceeds a preset interference threshold value range, to indicate that the terminal cannot use the any to-be-used spectrum resource.

The first cell is any cell in a first system, the second cell is any cell in a second system, and the second cell is a neighboring cell of the first cell.

Specifically, the status reporting unit 71 may be configured to report the acquired spectrum resource real-time occupation status to the network-side coordination device in a manner of receiving a spectrum resource status acquiring instruction delivered by the network-side coordination device and returning, according to the spectrum resource status acquiring instruction, a response message that carries corresponding spectrum resource real-time occupation status information to the network-side coordination device; or may be configured to report the acquired spectrum resource real-time occupation status to the network-side coordination device in an actively reporting manner, which is not limited in this embodiment of the present invention.

Figure 8:
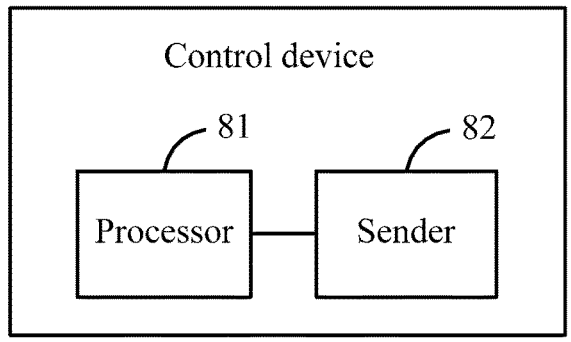
FIG. 8 is a second schematic structural diagram of a control device according to Embodiment 3 of the present invention.

Further, Embodiment 3 of the present invention further provides another control device (that is, a physical control device) that is based on a same invention concept with the control device shown in FIG. 7. As shown in FIG. 8, FIG. 8 is a schematic structural diagram of another control device according to Embodiment 3 of the present invention. The control device may include a processor 81 and a sender 82.

The processor 81 may be configured to acquire a spectrum resource real-time occupation status of a second cell.

The sender 82 may be configured to report the spectrum resource real-time occupation status acquired by the processor to a network-side coordination device, so that the network-side coordination device determines, when receiving an interference coordination request initiated by a terminal located in any area of a first cell for any to-be-used spectrum resource, and according to a pre-established interference matrix for representing historical reference interference of each second cell to each area in the first cell and the acquired spectrum resource real-time occupation status of each second cell, a sum of actual interference of all second cells to the any to-be-used spectrum resource to be used by the terminal, and delivers a first scheduling indication to the terminal when determining that the sum of the actual interference does not exceed a preset interference threshold value range, to indicate that the terminal can use the any to-be-used spectrum resource; or delivers a second scheduling indication to the terminal when determining that the sum of the actual interference exceeds a preset interference threshold value range, to indicate that the terminal cannot use the any to-be-used spectrum resource.

The first cell is any cell in a first system, the second cell is any cell in a second system, and the second cell is a neighboring cell of the first cell.

Embodiment 3 of the present invention provides a control device that can perform information interaction with the network-side device described in Embodiment 1 of the present invention. In the technical solutions of Embodiment 3 of the present invention, the control device may acquire a spectrum resource real-time occupation status of a second cell, and report the acquired spectrum resource real-time occupation status to a network-side coordination device, so that the network-side coordination device determines, when receiving an interference coordination request initiated by a terminal located in any area of a first cell for any to-be-used spectrum resource, and according to a pre-established interference matrix for representing historical reference interference of each second cell to each area in the first cell and the acquired spectrum resource real-time occupation status of each second cell, a sum of actual interference of all second cells to the any to-be-used spectrum resource to be used by the terminal, and delivers a first scheduling indication to the terminal when determining that the sum of the actual interference does not exceed a preset interference threshold value range, to indicate that the terminal can use the any to-be-used spectrum resource; or delivers a second scheduling indication to the terminal when determining that the sum of the actual interference exceeds a preset interference threshold value range, to indicate that the terminal cannot use the any to-be-used spectrum resource, where the first cell is any cell in a first system, the second cell is any cell in a second system, and the second cell is a neighboring cell of the first cell. In this way, systems with different standards can be deployed at a same frequency at the same time, and spectrum resources can be alternately used or simultaneously used between the different standards according to an interference coordination method in a frequency domain, thereby greatly improving spectrum utilization; moreover, LTE with higher system bandwidth can be deployed without the need of purchasing a new spectrum, thereby providing a more competitive network for a terminal user.

Embodiment 4

Figure 9:
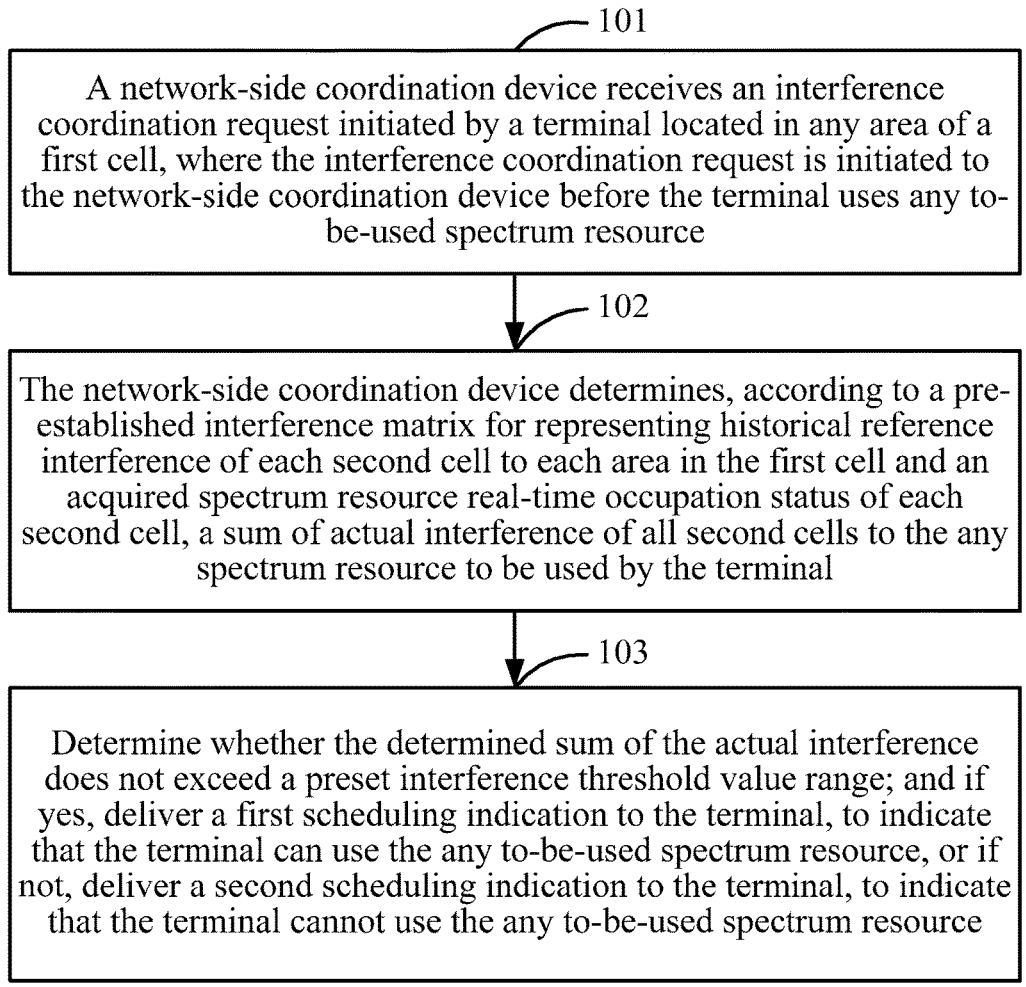
FIG. 9 is a schematic flowchart of an interference coordination method according to Embodiment 4 of the present invention.

Embodiment 4 of the present invention provides an interference coordination method applicable to the network-side coordination device described in Embodiment 1 of the present invention. As shown in FIG. 9, FIG. 9 is a schematic flowchart of the interference coordination method in Embodiment 4 of the present invention, and the interference coordination method may specifically include the following steps.

Step 101: A network-side coordination device receives an interference coordination request initiated by a terminal located in any area of a first cell, where the interference coordination request is initiated to the network-side coordination device before the terminal uses any to-be-used spectrum resource.

It should be noted that, in this embodiment of the present invention, any spectrum resource to be used by the terminal in the first cell may generally refer to any spectrum resource in spectrum resources that are at the same frequency with spectrum resources configured in a second cell, which is not described in detail in this embodiment of the present invention. It should be noted that, any spectrum resource to be used by the terminal in the first cell may also refer to any spectrum resource in spectrum resources that are at different frequencies from spectrum resources configured in the second cell, which is not limited in this embodiment of the present invention. As described above, the first cell is any cell in a first system, the second cell is any cell in a second system, and the second cell is a neighboring cell of the first cell, which is not described in detail in this embodiment of the present invention.

In addition, it should be noted that, in this embodiment of the present invention, if an example in which the first cell is an LTE cell is used, because a resource used by a terminal in an LTE system is scheduled by using an RB (Resource Block, resource block) or an RBG (Resource Block Group, resource block group) as a minimum resource unit, in this case, any spectrum resource to be used by the terminal in the first cell may generally refer to any RB or any RBG; if an example in which the first cell is a GSM cell is used, any spectrum resource to be used by the terminal in the first cell may generally refer to any frequency channel number, which is not described in detail in this embodiment of the present invention.

Step 102: The network-side coordination device determines, according to a pre-established interference matrix for representing historical reference interference of each second cell to each area in the first cell and an acquired spectrum resource real-time occupation status of each second cell, a sum of actual interference of all second cells to the any spectrum resource to be used by the terminal.

Specifically, in either a GSM system or the LTE system, traffic distribution characteristics of users in a cell are relatively fixed and are periodical, and locations and transmit power of cell sites in a system are also relatively fixed. Therefore, traffic model data of a cell may be acquired by using measurement information reported by each terminal in the GSM system or the LTE system, and then an interference matrix capable of representing an interference relationship between the GSM system and the LTE system is constructed according to the acquired measurement information or the traffic model data.

Specifically, in this embodiment of the present invention, by using an interference matrix for representing historical reference interference of each second cell to each area in the first cell as an example, the interference matrix for representing the historical reference interference of each second cell to each area in the first cell may be established by the network-side coordination device based on the measurement information that is reported by each terminal in the first cell within a set time period and collected in advance. The measurement information may specifically include any one or more of signal strength of a signal received by each terminal in the first cell from each second cell, signal quality of the signal received by each terminal in the first cell from each second cell, a distance between each second cell and a location of each terminal in the first cell, and a signal loss of a signal transmitted from each second cell to the location of each terminal in the first cell, which are not limited in this embodiment of the present invention. In addition, it should be noted that, the interference matrix for representing the historical reference interference of each second cell to each area in the first cell may also be established based on measurement information reported by each terminal in the second cell that is co-site and co-coverage with the first cell, which is not limited in this embodiment of the present invention.

Further, still by using the interference matrix for representing the historical reference interference of each second cell to each area in the first cell as an example, the establishing, based on the measurement information that is reported by each terminal in the first cell within a set time period and collected in advance, the interference matrix for representing the historical reference interference of each second cell to each area in the first cell may include the following steps:

Step S1: Divide a cell coverage area of the first cell into N sub-areas according to a set area division rule, where N is any natural number; specifically, the cell coverage area of the first cell may be divided into the N sub-areas according to a distance between each area in the cell coverage area of the first cell and a serving base station of the first cell, signal strength of a signal received by each area in the cell coverage area of the first cell from the serving base station of the first cell, signal quality of the signal received by each area in the cell coverage area of the first cell from the serving base station of the first cell, a path loss from the serving base station of the first cell to each area in the cell coverage area of the first cell, and the like, which are not limited in this embodiment of the present invention. It should be noted that, preferably, N is generally a natural number greater than 1, which is not described in detail in this embodiment of the present invention.

Step S2: For any sub-area, determine, according to the measurement information that is reported by each terminal in the first cell and collected in the set time period (which specifically may be measurement information that is collected in the set time period and reported by each terminal located in the any sub-area), historical reference interference of each spectrum resource configured in each second cell to the any sub-area, and generate, according to the determined historical reference interference of each spectrum resource configured in each second cell to the any sub-area, an interference sub-matrix corresponding to the any sub-area.

An expression manner of the historical reference interference of each second cell to each area in the first cell may at least include: any one or more of signal strength of a signal transmitted from each second cell when the signal arrives at each area in the first cell, signal quality of the signal transmitted from each second cell when the signal arrives at each area in the first cell, a distance between each second cell and each area in the first cell, and a signal loss of a signal transmitted from each second cell when the signal arrives at each area in the first cell, which are not limited in this embodiment of the present invention.

Step S3: Use an interference sub-matrix set formed by all determined interference sub-matrixes corresponding to all sub-areas as the established interference matrix for representing the historical reference interference of each second cell to each area in the first cell.

For example, as shown in FIG. 3, a cell coverage area of CELL1 (that is, the first cell) is divided into a sub-area 1, a sub-area 2, . . . , and a sub-area N; and interference relationship data between CELL1 and each of neighboring cells CELL2, CELL3, . . . and CELLK (the CELL2, CELL3, . . . and CELLK are second cells, and K is any natural number greater than or equal to 1) in the sub-area 1, interference relationship data between CELL1 and each of the neighboring cells CELL2, CELL3, . . . and CELLK in the sub-area 2, . . . , and interference relationship data between CELL1 and each of the neighboring cells CELL2, CELL3, . . . and CELLK in the sub-area N are collected, so as to form an interference matrix between cells at different locations. The interference sub-matrix corresponding to each sub-area may reflect an interference impact of each of the neighboring cells CELL2, CELL3, . . . and CELLK on CELL1 in this sub-area, where the interference impact may be expressed as quality, a distance, a level, a path loss, or the like. A set of interference sub-matrixes corresponding to all sub-areas obtained after division in a cell converge area forms an interference matrix of this cell. Similarly, each cell may determine, according to the foregoing interference matrix determining manner, an interference matrix for representing historical reference interference of each surrounding neighboring cell to each area in the cell, which is not described in detail in this embodiment of the present invention.

Further, it should be noted that, in this embodiment of the present invention, after the interference matrix is pre-established, the measurement information that is reported by each terminal in the first cell (or the measurement information reported by each terminal in the second cell that is co-site and co-coverage with the first cell) may be further collected in real time or regularly, and the pre-established interference matrix is updated based on the measurement information that is reported by each terminal in the first cell and collected in real time or regularly (or the measurement information reported by each terminal in the second cell that is co-site and co-coverage with the first cell), which is not described in detail in this embodiment of the present invention. For example, a system using an SON (Self-Organizing Network, self-organizing network) architecture can continually collect and update interference matrix data in a cell automatically, so as to achieve an objective of updating the interference matrix data in the cell in real time or regularly.

In addition, it should be noted that, in this embodiment of the present invention, the interference matrix may also be constructed based on a corresponding simulation result in addition to the measurement information of a current network, where the corresponding simulation result is obtained by performing level coverage predication with a simulation tool so as to simulate a topological structure of the current network and a signal transmission feature, which is not described in detail in this embodiment of the present invention.

Further, still by using the interference matrix for representing the historical reference interference of each second cell to each area in the first cell, after the foregoing interference matrix is obtained, it may be determined, according to the corresponding interference matrix and the acquired spectrum resource real-time occupation status of each second cell, a sum of actual interference of all second cells to any spectrum resource to be used by the terminal located in any area of the first cell.

Specifically, by using an example in which the first cell is any cell in the LTE system and the second cell is any cell in the GSM system, the determining, according to the established interference matrix for representing the historical reference interference of each second cell to each area in the first cell and the spectrum resource real-time occupation status of each second cell, a sum of actual interference of all second cells to any spectrum resource to be used by the terminal located in any area of the first cell may include the following steps:

Step S1: Determine a spectrum resource real-time occupation status S of each second cell, where the spectrum resource real-time occupation status S is shown in the following formula:

S={CELL_1(X0, X1, . . . , Xi), CELL_2(X0, X1, . . . , Xi), . . . , CELL_n(X0, X1, . . . , Xi)}, where n is a quantity of the second cells and n is any natural number, i indicates a quantity of spectrum resources configured in each second cell and i is any natural number, and Xi indicates a real-time occupation status of the $i^{th}$ spectrum resource configured in each second cell, where it indicates that the spectrum resource is occupied if a value of Xi is 1 and it indicates that the spectrum resource is released if the value is 0.

Specifically, the network-side coordination device may acquire the spectrum resource real-time occupation status of each second cell in a manner of delivering a spectrum resource status acquiring instruction to a control device of each second cell and receiving a response message that carries corresponding spectrum resource real-time occupation status information and is returned by a control device of each second cell; or acquire the spectrum resource real-time occupation status of each second cell in a manner of receiving spectrum resource real-time occupation status information of each second cell that is reported actively by a control device of each second cell, which is not limited in this embodiment of the present invention. The control device of the second cell may be a device such as a serving base station of the second cell, which is not described in detail in this embodiment of the present invention.

Step S2: Determine, according to the established interference matrix for representing the historical reference interference of each second cell to each area in the first cell, historical reference interference $I_n$ of each spectrum resource configured in the $n^{th}$ second cell to the terminal in the any area, where $I_n$ is shown in the following formula:

$I_n$=CELL_n(Y0, Y1, ..., Yi), where CELL_n(Yi) indicates historical reference interference of the $i^{th}$ spectrum resource configured in the $n^{th}$ second cell to the terminal in the any area.

Step S3: Determine, by using the following formula, a sum $I_{total}$ of actual interference of all spectrum resources configured in all second cells to any spectrum resource to be used by the terminal in the any area:

$I_{total}$=CELL_1(X0*Y0*θ0+X1*Y1*θ1+...+Xi*Yi*θi)+ CELL_2(X0*Y0*θ0+X1*Y1*θ1+...+Xi*Yi*θi)+...+ CELL_n(X0*Y0*θ0+X1*Y1*θ1+...+Xi*Yi*θi).

In the foregoing formula, θ indicates an interference weight modification value corresponding to each spectrum resource configured in the $n^{th}$ second cell, and CELL_n (Xi*Yi) may indicate actual interference of the $i^{th}$ spectrum resource configured in the $n^{th}$ second cell to the any spectrum resource to be used by the terminal in the any area. Specifically, the interference weight modification value corresponding to each spectrum resource configured in each second cell may be generally determined according to different interfering cells in a historically collected data sample and a prediction error between interference at a different interfering frequency in each cell and actual interference, so as to correspondingly modify the interference according to an actual condition, so that finally calculated interference approaches actual interference.

It can be known from the foregoing content that, in order to accurately estimate a condition of interference of each second cell to a terminal at a certain location of the first cell, a resource actually used by each second cell needs to be taken into consideration. Specifically, for a GSM cell, interference generated when a user occupies a carrier configured in the GSM cell is different from that generated when no user occupies the carrier, and interference generated when only one user occupies the carrier is also different from that generated when multiple users occupy the carrier; and a total of adding interference powers needs to be taken into consideration if multiple carriers configured in the GSM cell are all occupied. Similarly, LTE bandwidth includes multiple RB resources, and interference to the GSM is also different if the LTE uses a different RB resource. Therefore, during calculation of interference of each GSM cell in the GSM system to each LTE cell in the LTE system, it is required to know conditions about the carrier occupied in the GSM cell and the user occupying each carrier; correspondingly, during calculation of interference of each LTE cell in the LTE system to each GSM cell in the GSM system, it is required to know an RB occupation condition in each LTE cell.

Step 103: Determine whether the determined sum of the actual interference does not exceed a preset interference threshold value range; and if yes, deliver a first scheduling indication to the terminal, to indicate that the terminal can use the any to-be-used spectrum resource, or if not, deliver a second scheduling indication to the terminal, to indicate that the terminal cannot use the any to-be-used spectrum resource.

Specifically, in this embodiment of the present invention, the determining whether the determined sum of the actual interference does not exceed a preset interference threshold value range may generally refer to: determining whether the determined sum of the actual interference falls within a numeric value interval defined by the preset interference threshold value range.

For example, when an expression manner of the historical reference interference or the actual interference of each second cell to each area in the first cell is an expression manner in which a larger numeric value of signal strength of a signal transmitted from each second cell when the signal arrives at each area in the first cell or signal quality of a signal transmitted from each second cell when the signal arrives at each area in the first cell indicates greater intensity of interference suffered by the terminal, the interference threshold value range generally refers to a numeric value interval in which numeric values are not greater than a set first interference threshold. In such a case, when it is determined that the sum of the actual interference is not greater than the set first interference threshold, it may be considered that the sum of the actual interference does not exceed the set interference threshold value range; or when it is determined that the sum of the actual interference is greater than the set first interference threshold, it may be considered that the sum of the actual interference exceeds the set interference threshold value range.

For another example, when an expression manner of the historical reference interference or the actual interference of each second cell to each area in the first cell is an expression manner in which a larger numeric value of a distance between each second cell and each area in the first cell or a signal loss of a signal transmitted from each second cell when the signal arrives at each area in the first cell indicates smaller intensity of interference suffered by the terminal, the interference threshold value range generally refers to a numeric value interval in which numeric values are not less than a set second interference threshold. In such a case, when it is determined that the sum of the actual interference is not less than the set second interference threshold, it may be considered that the sum of the actual interference does not exceed the set interference threshold value range; correspondingly, when it is determined that the sum of the actual interference is less than the set second interference threshold, it may be considered that the sum of the actual interference exceeds the set interference threshold value range.

Further, it should be noted that, in this embodiment of the present invention, the set interference threshold value range may be adjusted and set according to a service type of the terminal, which is not limited in this embodiment of the present invention.

In addition, it should be noted that, in this embodiment of the present invention, whether the terminal can use any spectrum resource in all spectrum resources configured in the second cell may be determined based on the preset interference matrix for representing the historical reference interference of each second cell to each area in the first cell and the spectrum resource real-time occupation status of each second cell; or whether the terminal can use the any spectrum resource may also be determined in a manner of measuring, in a certain measurement period and in real time, a value of adding real-time interference of all second cells to any spectrum resource to be used by the terminal located in any area of the first cell, which is not limited in this embodiment of the present invention.

For example, by using LTE as an example, interference energy suffered by each RB or RBG on a shared spectrum (that is, a spectrum resource configured in the GSM cell) is measured in real time in a certain measurement period, and if the interference energy suffered by the RB or RBG exceeds the set interference threshold value range, it may be considered that the RB or RBG cannot be scheduled; and until it is measured in a certain measurement period that the interference energy suffered by the RB or RBG does not exceed the set interference threshold value range, it may be considered that the RB or RBG can be scheduled.

That is, in the technical solutions of Embodiment 4 of the present invention, for a terminal located in any area of a first cell, a network-side coordination device may determined, according to a pre-established interference matrix for representing historical reference interference of each second cell to each area in the first cell and a spectrum resource real-time occupation status of each second cell, a sum of actual interference of all second cells to any spectrum resource to be used by the terminal; determine that the terminal can use the any spectrum resource when determining that the sum of the actual interference does not exceed a preset interference threshold value range, or determine that the terminal cannot use the any spectrum resource when determining that the sum of the actual interference exceeds a preset interference threshold value range, where the first cell is any cell in a first system, the second cell is any cell in a second system, and the second cell is a neighboring cell of the first cell. In this way, systems with different standards can be deployed at a same frequency at the same time, and spectrum resources can be alternately used or simultaneously used between the different standards according to an interference coordination method in a frequency domain, thereby greatly improving spectrum utilization; moreover, LTE with higher system bandwidth can be deployed without the need of purchasing a new spectrum, thereby providing a more competitive network for a terminal user.

Embodiment 5

Figure 10:
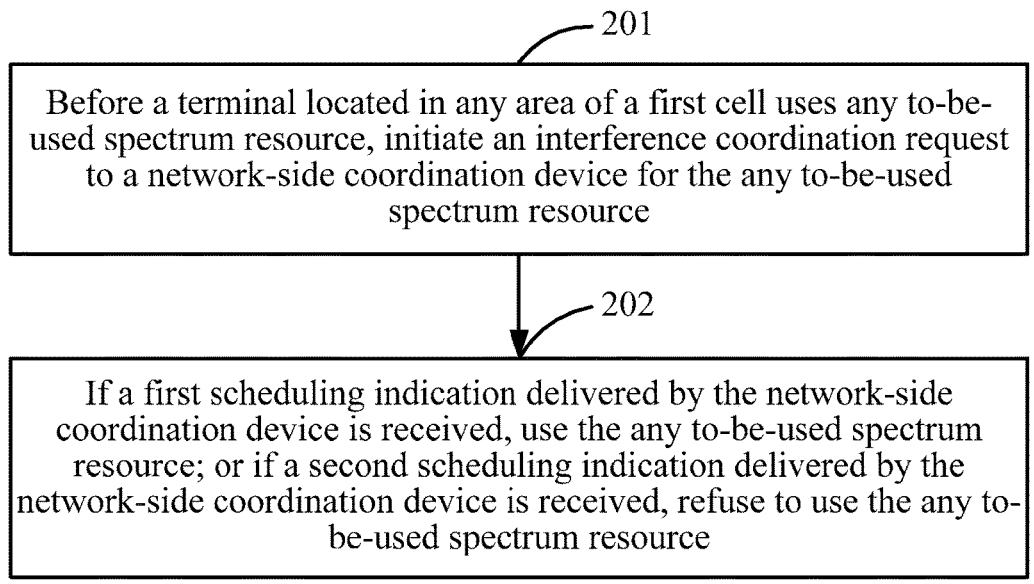
FIG. 10 is a schematic flowchart of an interference coordination method according to Embodiment 5 of the present invention.

Embodiment 5 of the present invention provides an interference coordination method applicable to the terminal described in Embodiment 2 of the present invention. As shown in FIG. 10, FIG. 10 is a schematic flowchart of the interference coordination method in Embodiment 5 of the present invention, and the interference coordination method may specifically include the following steps.

Step 201: Before a terminal located in any area of a first cell uses any to-be-used spectrum resource, initiate an interference coordination request to a network-side coordination device for the any to-be-used spectrum resource.

It should be noted that, in this embodiment of the present invention, any spectrum resource to be used by the terminal may generally refer to any spectrum resource in spectrum resources that are at a same frequency with spectrum resources configured in a second cell, which is not described in detail in this embodiment of the present invention. Certainly, it should be noted that, the any spectrum resource to be used by the terminal may also refer to any spectrum resource in spectrum resources that are at different frequencies from spectrum resources configured in the second cell, which is not limited in this embodiment of the present invention. As described above, the first cell is any cell in a first system, the second cell is any cell in a second system, and the second cell is a neighboring cell of the first cell.

Step 202: If a first scheduling indication delivered by the network-side coordination device is received, use the any to-be-used spectrum resource; if a second scheduling indication delivered by the network-side coordination device is received, refuse to use the any to-be-used spectrum resource.

The first scheduling indication may be generally delivered by the network-side coordination device to the terminal when the network-side coordination device determines, after receiving the interference coordination request and according to a pre-established interference matrix for representing historical reference interference of each second cell to each area in the first cell and an acquired spectrum resource real-time occupation status of each second cell, that a sum of actual interference of all second cells to the any to-be-used spectrum resource to be used by the terminal does not exceed a preset interference threshold value range; the second scheduling indication may be generally delivered by the network-side coordination device to the terminal when the network-side coordination device determines that the sum of the actual interference of all second cells to the any to-be-used spectrum resource to be used by the terminal exceeds the preset interference threshold value range, where, as described above, the first cell is any cell in a first system, the second cell is any cell in a second system, and the second cell is a neighboring cell of the first cell.

Further, in this embodiment of the present invention, before, at the same when, or after the terminal initiates the interference coordination request to the network-side coordination device, the method may further include:

reporting measurement information to the network-side coordination device in real time or regularly, so that the network-side coordination device may perform an operation such as pre-establishing a corresponding interference matrix according to the measurement information reported by the terminal or correspondingly updating the pre-established interference matrix, which is not described in detail in this embodiment of the present invention.

The measurement information may specifically include any one or more of signal strength of a signal received by the terminal from each second cell, signal quality of the signal received by the terminal from each second cell, a distance between each second cell and a location of the terminal, and a signal loss of a signal transmitted from each second cell to the location of the terminal.

That is, in the technical solutions of Embodiment 5 of the present invention, for a terminal located in any area of a first cell, before using any to-be-used spectrum resource, the terminal may initiate an interference coordination request to a network-side coordination device for the any to-be-used spectrum resource, and use, after receiving a first scheduling indication delivered by the network-side coordination device, the any to-be-used spectrum resource according to the first scheduling indication; or refuse to use, after receiving a second scheduling indication delivered by the network-side coordination device, the any to-be-used spectrum resource according to the second scheduling indication, where the first scheduling indication may be delivered by the network-side coordination device to the terminal when the network-side coordination device determines, after receiving the interference coordination request and according to a pre-established interference matrix for representing historical reference interference of each second cell to each area in the first cell and an acquired spectrum resource real-time occupation status of each second cell, that a sum of actual interference of all second cells to the any to-be-used spectrum resource to be used by the terminal does not exceed a preset interference threshold value range; the second scheduling indication may be delivered by the network-side coordination device to the terminal when the network-side coordination device determines that the sum of the actual interference of all second cells to the any to-be-used spectrum resource to be used by the terminal exceeds the preset interference threshold value range; the first cell is any cell in a first system, the second cell is any cell in a second system, and the second cell is a neighboring cell of the first cell. In this way, systems with different standards can be deployed at a same frequency at the same time, and spectrum resources can be alternately used or simultaneously used between the different standards according to an interference coordination method in a frequency domain, thereby greatly improving spectrum utilization; moreover, LTE with higher system bandwidth can be deployed without the need of purchasing a new spectrum, thereby providing a more competitive network for a terminal user.

Embodiment 6

Figure 11:
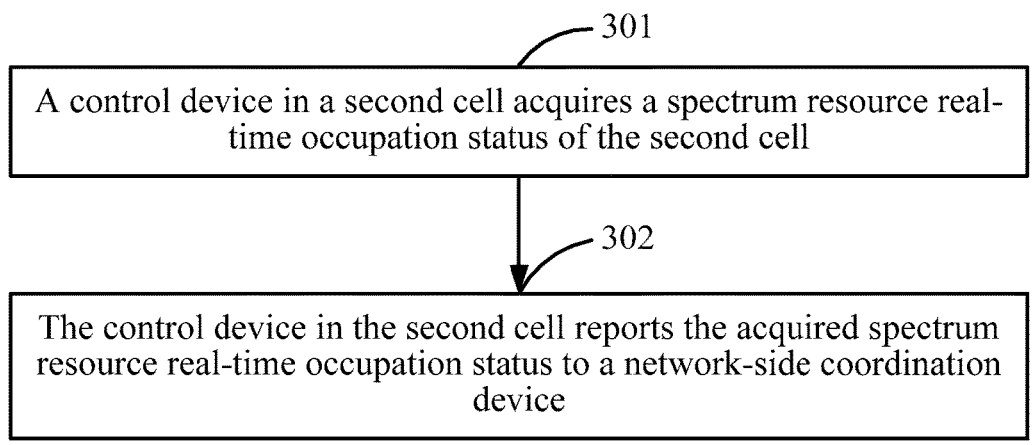
FIG. 11 is a schematic flowchart of an interference coordination method according to Embodiment 6 of the present invention.

Embodiment 6 of the present invention provides an interference coordination method applicable to the control device described in Embodiment 3 of the present invention. As shown in FIG. 11, FIG. 11 is a schematic flowchart of the interference coordination method in Embodiment 6 of the present invention, and the interference coordination method may specifically include the following steps.

Step 301: A control device in a second cell acquires a spectrum resource real-time occupation status of the second cell.

Step 302: The control device in the second cell reports the acquired spectrum resource real-time occupation status to a network-side coordination device, so that the network-side coordination device determines, when receiving an interference coordination request initiated by a terminal located in any area of a first cell for any to-be-used spectrum resource, and according to a pre-established interference matrix for representing historical reference interference of each second cell to each area in the first cell and the acquired spectrum resource real-time occupation status of each second cell, a sum of actual interference of all second cells to the any to-be-used spectrum resource to be used by the terminal, and delivers a first scheduling indication to the terminal when determining that the sum of the actual interference does not exceed a preset interference threshold value range, to indicate that the terminal can use the any to-be-used spectrum resource; or delivers a second scheduling indication to the terminal when determining that the sum of the actual interference exceeds a preset interference threshold value range, to indicate that the terminal cannot use the any to-be-used spectrum resource.

The first cell is any cell in a first system, the second cell is any cell in a second system, and the second cell is a neighboring cell of the first cell.

That is, in the technical solutions of Embodiment 6 of the present invention, a control device may acquire a spectrum resource real-time occupation status of a second cell, and report the acquired spectrum resource real-time occupation status to a network-side coordination device, so that the network-side coordination device determines, when receiving an interference coordination request initiated by a terminal located in any area of a first cell for any to-be-used spectrum resource, and according to a pre-established interference matrix for representing historical reference interference of each second cell to each area in the first cell and the acquired spectrum resource real-time occupation status of each second cell, a sum of actual interference of all second cells to the any to-be-used spectrum resource to be used by the terminal, and delivers a first scheduling indication to the terminal when determining that the sum of the actual interference does not exceed a preset interference threshold value range, to indicate that the terminal can use the any to-be-used spectrum resource; or delivers a second scheduling indication to the terminal when determining that the sum of the actual interference exceeds a preset interference threshold value range, to indicate that the terminal cannot use the any to-be-used spectrum resource, where the first cell is any cell in a first system, the second cell is any cell in a second system, and the second cell is a neighboring cell of the first cell. In this way, systems with different standards can be deployed at a same frequency at the same time, and spectrum resources can be alternately used or simultaneously used between the different standards according to an interference coordination method in a frequency domain, thereby greatly improving spectrum utilization; moreover, LTE with higher system bandwidth can be deployed without the need of purchasing a new spectrum, thereby providing a more competitive network for a terminal user.

A person skilled in the art should understand that the embodiments of the present invention may be provided as a method, an apparatus (device), or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the apparatus (device), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A network-side coordination device, comprising:
a receiver, configured to receive an interference coordination request initiated by a terminal located in an area of a first cell;
a processor, configured to pre-establish an interference matrix for representing historical reference interference of each second cell to each area in the first cell; acquire a spectrum resource real-time occupation status of each second cell; determine, according to the pre-established interference matrix and the acquired spectrum resource real-time occupation status of each second cell, a sum of actual interference of all second cells to a spectrum resource to be used by the terminal; determine whether the determined sum of the actual interference does not exceed a preset interference threshold value range; and if the determined sum of the actual interference does not exceed the preset interference threshold value range, trigger a sender to deliver a first scheduling indication to the terminal, or if the determined sum of the actual interference exceeds the preset interference threshold value range, trigger a sender to deliver a second scheduling indication to the terminal; and
the sender, configured to deliver, as triggered by the processor, the first scheduling indication to the terminal, to indicate that the terminal can use the to-be-used spectrum resource; or deliver, as triggered by the processor, the second scheduling indication to the terminal, to indicate that the terminal cannot use the to-be-used spectrum resource;
wherein the first cell is in a first system, each second cell is in a second system, and each second cell is a neighboring cell of the first cell.

2. The network-side coordination device according to claim 1, wherein the first and second systems are any two of: a Global System for Mobile Communications (GSM), a Universal Mobile Telecommunications System (UMTS), a Long Term Evolution (LTE) system, a Code Division Multiple Access (CDMA) system, a Time Division-Synchronous Code Division Multiple Access (TD-SCDMA) system, and a wireless local area network (WLAN) system.

3. The network-side coordination device according to claim 1, wherein the processor is further configured to establish the interference matrix based on measurement information that is reported by each terminal in the first cell within a set time period and collected in advance, wherein the measurement information comprises one or more of:
signal strength of a signal received by each terminal in the first cell from each second cell,
signal quality of the signal received by each terminal in the first cell from each second cell,
a distance between each second cell and a location of each terminal in the first cell, and
a signal loss of a signal transmitted from each second cell to the location of each terminal in the first cell.

4. The network-side coordination device according to claim 3, wherein the processor is further configured to collect, in real time or regularly, the measurement information reported by each terminal in the first cell, and update the pre-established interference matrix according to the collected measurement information.

5. The network-side coordination device according to claim 3, wherein the processor is further configured to:
divide a cell coverage area of the first cell into N sub-areas according to a set area division rule, wherein N is a natural number;
for a sub-area, determine, according to the measurement information that is reported by each terminal in the first cell and collected in the set time period, historical reference interference of each spectrum resource configured in each second cell to the sub-area;
generate, according to the determined historical reference interference of each spectrum resource configured in each second cell to the sub-area, an interference sub-matrix corresponding to the sub-area; and
use an interference sub-matrix set formed by all determined interference sub-matrixes corresponding to all sub-areas as the established interference matrix for representing the historical reference interference of each second cell to each area in the first cell.

6. The network-side coordination device according to claim 1, wherein an expression manner of the historical reference interference or the actual interference of each second cell to each area in the first cell at least comprises one or more of:
signal strength of a signal transmitted from each second cell when the signal arrives at each area in the first cell,
signal quality of the signal transmitted from each second cell when the signal arrives at each area in the first cell,
a distance between each second cell and each area in the first cell, and
a signal loss of a signal transmitted from each second cell when the signal arrives at each area in the first cell.

7. The network-side coordination device according to claim 2, wherein if the first cell is in an LTE system and each second cell is in a GSM system, the processor is further configured to:
determine a spectrum resource real-time occupation status S of each second cell, wherein the spectrum resource real-time occupation status S is shown in the following formula:
S={CELL_1(X0, X1, ... , Xi), CELL_2(X0, X1, ... , Xi), ... , CELL n(X0, X1, ... , Xi)},
wherein n is a quantity of the second cells and n is a natural number; i indicates a quantity of spectrum resources configured in each second cell and i is a natural number; and Xi indicates a real-time occupation status of the $i^{th}$ spectrum resource configured in each second cell, wherein a value of Xi being 1 corresponds to the spectrum resource being occupied and the value of Xi being 0 corresponds to the spectrum resource being released;
determine, according to the interference matrix, historical reference interference $I_n$ of each spectrum resource configured in the $n^{th}$ second cell to the terminal in the area of the first cell, wherein $I_n$ is shown in the following formula:
$I_n$=CELL_n(Y0, Y1, ... Yi),
wherein CELL_n(Yi) indicates historical reference interference of the $i^{th}$ spectrum resource configured in the $n^{th}$ second cell to the terminal in the area of the first cell; and
determine, by using the following formula, a sum $I_{total}$ of actual interference of all spectrum resources configured in all second cells to the spectrum resource to be used by the terminal in the area of the first cell:

$I_{total}$=CELL_1(X0*Y0*θ0+X1*Y1*θ1+ . . . +Xi*Yi*θi)+ CELL_2(X0*Y0*θ0+X1*Y1*θ1+ . . . +Xi*Yi*θi)+ . . . + CELL_n(X0*Y0*θ0+X1*Y1*θ1+ . . . +Xi*Yi*θi),
wherein θ indicates an interference weight modification value of each spectrum resource, and CELL_n(Xi*Yi) indicates actual interference of the $i^{th}$ spectrum resource configured in the $n^{th}$ second cell to the spectrum resource to be used by the terminal in the area of the first cell.

8. A terminal, comprising:
   a sender, configured to: when the terminal is located in an area of a first cell, initiate an interference coordination request to a network-side coordination device for a spectrum resource to be used by the terminal;
   a receiver, configured to receive a first scheduling indication or a second scheduling indication delivered by the network-side coordination device, wherein the first scheduling indication is based on the network-side coordination device determining, after receiving the interference coordination request and according to a pre-established interference matrix for representing historical reference interference of each second cell to each area in the first cell and an acquired spectrum resource real-time occupation status of each second cell, that a sum of actual interference of all second cells to the to-be-used spectrum resource does not exceed a preset interference threshold value range; and wherein the second scheduling indication is based on the network-side coordination device determining that the sum of the actual interference of all second cells to the to-be-used spectrum resource exceeds the preset interference threshold value range; and
   a processor, configured to: when the receiver receives the first scheduling indication delivered by the network-side coordination device, use the to-be-used spectrum resource according to the first scheduling indication; or when the receiver receives the second scheduling indication delivered by the network-side coordination device, refuse to use the to-be-used spectrum resource according to the second scheduling indication;
   wherein the first cell is in a first system, each second cell is in a second system, and each second cell is a neighboring cell of the first cell.

9. The terminal according to claim 8, wherein the first and second systems are any two of: a Global System for Mobile Communications (GSM), a Universal Mobile Telecommunications System (UMTS), a Long Term Evolution (LTE) system, a Code Division Multiple Access (CDMA) system, a Time Division-Synchronous Code Division Multiple Access (TD-SCDMA) system, and a wireless local area network (WLAN) system.

10. The terminal according to claim 8, wherein the sender is further configured to report measurement information to the network-side coordination device in real time or regularly, wherein the measurement information comprises one or more of:
   signal strength of a signal received by the terminal from each second cell, signal quality of the signal received by the terminal from each second cell,
   a distance between each second cell and a location of the terminal, and
   a signal loss of a signal transmitted from each second cell to the location of the terminal.

11. A control device, comprising:
   a processor, configured to acquire a spectrum resource real-time occupation status of a second cell; and
   a sender, configured to report the spectrum resource real-time occupation status acquired by the processor to a network-side coordination device to facilitate the network-side coordination device determining, when receiving an interference coordination request initiated by a terminal located in an area of a first cell for a spectrum resource to be used by the terminal, and according to a pre-established interference matrix for representing historical reference interference of each second cell to each area in the first cell and the acquired spectrum resource real-time occupation status of each second cell, a sum of actual interference of all second cells to the to-be-used spectrum resource, and delivering a first scheduling indication to the terminal, when it is determined that the sum of the actual interference does not exceed a preset interference threshold value range, to indicate that the terminal can use the to-be-used spectrum resource or delivering a second scheduling indication to the terminal, when it is determined that the sum of the actual interference exceeds a preset interference threshold value range, to indicate that the terminal cannot use the to-be-used spectrum resource;
   wherein
   the first cell is in a first system, each second cell is in a second system, and each second cell is a neighboring cell of the first cell.

12. The control device according to claim 11, wherein the first and second systems are any two of: a Global System for Mobile Communications (GSM), a Universal Mobile Telecommunications System (UMTS), a Long Term Evolution (LTE) system, a Code Division Multiple Access (CDMA) system, a Time Division-Synchronous Code Division Multiple Access (TD-SCDMA) system, and a wireless local area network (WLAN) system.

13. An interference coordination method, comprising:
   receiving, by a network-side coordination device, an interference coordination request initiated by a terminal located in an area of a first cell;
   determining, according to a pre-established interference matrix for representing historical reference interference of each second cell to each area in the first cell and an acquired spectrum resource real-time occupation status of each second cell, a sum of actual interference of all second cells to a spectrum resource to be used by the terminal; and
   determining whether the determined sum of the actual interference does not exceed a preset interference threshold value range; wherein in case that the determined sum of the actual interference does not exceed the preset interference threshold value range, a first scheduling indication is delivered to the terminal to indicate that the terminal can use the to-be-used spectrum resource, and in case that the determined sum of the actual interference exceeds the preset interference threshold value range, a second scheduling indication is delivered to the terminal to indicate that the terminal cannot use the to-be-used spectrum resource;
   wherein the first cell is in a first system, each second cell is in a second system, and each second cell is a neighboring cell of the first cell.

14. The interference coordination method according to claim 13, wherein the first and second systems are any two of: a Global System for Mobile Communications (GSM), a Universal Mobile Telecommunications System (UMTS), a Long Term Evolution (LTE), a Code Division Multiple Access (CDMA) system, a Time Division-Synchronous Code Division Multiple Access (TD-SCDMA) system, and a wireless local area network (WLAN) system.

15. The interference coordination method according to claim 13, wherein the interference matrix is established by the network-side coordination device based on measurement information that is reported by each terminal in the first cell within a set time period and collected in advance, wherein the measurement information comprises one or more of:
- signal strength of a signal received by each terminal in the first cell from each second cell,
- signal quality of the signal received by each terminal in the first cell from each second cell,
- a distance between each second cell and a location of each terminal in the first cell, and
- a signal loss of a signal transmitted from each second cell to the location of each terminal in the first cell.

16. The interference coordination method according to claim 15, wherein the method further comprises:
- collecting, in real time or regularly, the measurement information that is reported by each terminal in the first cell, and updating the pre-established interference matrix based on the collected measurement information.

17. The interference coordination method according to claim 15, wherein establishing the interference matrix based on the measurement information that is reported by each terminal in the first cell within the set time period and collected in advance comprises:
- dividing a cell coverage area of the first cell into N sub-areas according to a set area division rule, wherein N is a natural number;
- for a sub-area, determining, according to the measurement information that is reported by each terminal in the first cell and collected in the set time period, historical reference interference of each spectrum resource configured in each second cell to the sub-area, and generating, according to the determined historical reference interference of each spectrum resource configured in each second cell to the sub-area, an interference sub-matrix corresponding to the sub-area; and
- using an interference sub-matrix set formed by all determined interference sub-matrixes corresponding to all sub-areas as the established interference matrix for representing the historical reference interference of each second cell to each area in the first cell.

18. The interference coordination method according to claim 13, wherein an expression manner of the historical reference interference or the actual interference of each second cell to each area in the first cell at least comprises one or more of:
- signal strength of a signal transmitted from each second cell when the signal arrives at each area in the first cell,
- signal quality of the signal transmitted from each second cell when the signal arrives at each area in the first cell,
- a distance between each second cell and each area in the first cell, and
- a signal loss of a signal transmitted from each second cell when the signal arrives at each area in the first cell.

19. The interference coordination method according to claim 14, wherein the first cell is in an LTE system and the second cell is in a GSM system, and wherein determining, according to the established interference matrix and the spectrum resource real-time occupation status of each second cell, the sum of actual interference of all second cells to the spectrum resource to be used by the terminal in the area of the first cell comprises:

determining a spectrum resource real-time occupation status S of each second cell, wherein the spectrum resource real-time occupation status S is shown in the following formula:

$S=\{CELL\_1(X0, X1, \ldots, Xi), CELL\_2(X0, X1, \ldots, Xi), \ldots, CELL\_n(X0, X1, \ldots, Xi)\}$, wherein n is a quantity of the second cells and n is a natural number; i indicates a quantity of spectrum resources configured in each second cell and i is a natural number; and $Xi$ indicates a real-time occupation status of the $i^{th}$ spectrum resource configured in each second cell, wherein a value of $Xi$ is being 1 corresponds to the spectrum resource being occupied and the value of $Xi$ being 0 corresponds to the spectrum resource being released;

determining, according to the interference matrix, historical reference interference $I_n$ of each spectrum resource configured in the $n^{th}$ second cell to the terminal in the area of the first cell, wherein $I_n$ is shown in the following formula:

$I_n = CELL\_n(Y0, Y1, \ldots, Yi)$, wherein $CELL\_n(Yi)$ indicates historical reference interference of the $i^{th}$ spectrum resource configured in the $n^{th}$ second cell to the terminal in the area of the first cell; and determining, by using the following formula, a sum $I_{total}$ of actual interference of all spectrum resources configured in all second cells to the spectrum resource to be used by the terminal in the area of the first cell:

$I_{total} = CELL\_1(X0*Y0*\theta0+X1*Y1*\theta1+ \ldots +Xi*Yi*\theta i)+ CELL\_2(X0*Y0*\theta0+X1*Y1*\theta1+ \ldots +Xi*Yi*\theta i)+ \ldots + CELL\_n(X0*Y0*\theta0+X1*Y1*\theta1+ \ldots +Xi*Yi*\theta i)$, wherein $\theta$ indicates an interference weight modification value of each spectrum resource, and $CELL\_n(Xi*Yi)$ indicates actual interference of the $i^{th}$ spectrum resource configured in the $n^{th}$ second cell to the spectrum resource to be used by the terminal in the area of the first cell.

20. An interference coordination method, comprising:
- initiating an interference coordination request to a network-side coordination device for a spectrum resource to be used by a terminal; and
- receiving a first scheduling indication or a second scheduling indication delivered by the network-side coordination device, wherein in case that the first scheduling indication is received, the to-be-used spectrum resource is used by the terminal, and in case that the second scheduling indication is received, the terminal refuses to use the to-be-used spectrum resource;
- wherein the first scheduling indication is based on the network-side coordination device determining, after receiving the interference coordination request and according to a pre-established interference matrix for representing historical reference interference of each second cell to each area in the first cell and an acquired spectrum resource real-time occupation status of each second cell, that a sum of actual interference of all second cells to the to-be-used spectrum resource does not exceed a preset interference threshold value range; and wherein the second scheduling indication is based on the network-side coordination device determining that the sum of the actual interference of all second cells to the to-be-used spectrum resource exceeds the preset interference threshold value range;
- wherein the first cell is in a first system, each second cell is in a second system, and each second cell is a neighboring cell of the first cell.

21. The interference coordination method according to claim 20, wherein the first and second systems are any two of: a Global System for Mobile Communications (GSM), a Universal Mobile Telecommunications System (UMTS), a Long Term Evolution (LTE) system, a Code Division Multiple Access (CDMA) system, a Time Division-Synchronous Code Division Multiple Access (TD-SCDMA) system, and a wireless local area network (WLAN) system.

22. The interference coordination method according to claim 20, wherein the method further comprises:
reporting measurement information to the network-side coordination device in real time or regularly, wherein the measurement information comprises one or more of:
signal strength of a signal received by the terminal from each second cell,
signal quality of the signal received by the terminal from each second cell,
a distance between each second cell and a location of the terminal, and
a signal loss of a signal transmitted from each second cell to the location of the terminal.

23. An interference coordination method, comprising:
acquiring, by a control device in a second cell, a spectrum resource real-time occupation status of the second cell; and
reporting the acquired spectrum resource real-time occupation status to a network-side coordination device to facilitate the network-side coordination device determining, when receiving an interference coordination request initiated by a terminal located in an area of a first cell for a spectrum resource to be used by the terminal, and according to a pre-established interference matrix for representing historical reference interference of each second cell to each area in the first cell and the acquired spectrum resource real-time occupation status of each second cell, a sum of actual interference of all second cells to the to-be-used spectrum resource, and delivering a first scheduling indication to the terminal, when it is determined that the sum of the actual interference does not exceed a preset interference threshold value range, to indicate that the terminal can use the to-be-used spectrum resource or delivering a second scheduling indication to the terminal, when it is determined that the sum of the actual interference exceeds a preset interference threshold value range, to indicate that the terminal cannot use the to-be-used spectrum resource;
wherein the first cell is in a first system, each second cell is in a second system, and each second cell is a neighboring cell of the first cell.

24. The interference coordination method according to claim 23, wherein the first and second systems are any two of: a Global System for Mobile Communications (GSM), a Universal Mobile Telecommunications System (UMTS), a Long Term Evolution (LTE) system, a Code Division Multiple Access (CDMA) system, a Time Division-Synchronous Code Division Multiple Access (TD-SCDMA) system, and a wireless local area network (WLAN) system.

* * * * *